(12) United States Patent
Huang et al.

(10) Patent No.: US 12,103,402 B2
(45) Date of Patent: Oct. 1, 2024

(54) SYSTEM AND METHOD FOR CONTROLLING DIRECTION OF A VEHICLE IN AN INDEPENDENT CART SYSTEM

(71) Applicant: Rockwell Automation Technologies, Inc., Mayfield Heights, OH (US)

(72) Inventors: Yuhong Huang, Acton, MA (US); Brian M. Perreault, Stow, MA (US); Tyler D. Roetzer, Lunenburg, MA (US); Azeddine Choumach, Littleton, MA (US); Peter Eric Malkowski, Lancaster, MA (US); Jason A. Young, Marlborough, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 202 days.

(21) Appl. No.: 17/944,721

(22) Filed: Sep. 14, 2022

(65) Prior Publication Data

US 2024/0083256 A1 Mar. 14, 2024

(51) Int. Cl.
*H02K 41/00* (2006.01)
*B60L 15/00* (2006.01)
(Continued)

(52) U.S. Cl.
CPC ............ *B60L 15/005* (2013.01); *B65G 35/06* (2013.01); *B60L 2200/26* (2013.01); *B65G 2203/043* (2013.01)

(58) Field of Classification Search
CPC .............................. B60L 15/005; B65G 35/06
(Continued)

(56) References Cited

U.S. PATENT DOCUMENTS

| 4,671,185 A | 6/1987 | Anderson et al. |
| 7,600,629 B2 | 10/2009 | Skljarow et al. |

(Continued)

FOREIGN PATENT DOCUMENTS

| EP | 1529639 A1 | 5/2005 |
| WO | 0144577 A1 | 6/2001 |
| WO | 2018161160 A1 | 9/2018 |

OTHER PUBLICATIONS

European Search Report in Application No. 23187188.0 dated Jan. 30, 2024 (14 pages).

(Continued)

*Primary Examiner* — Erick D Glass
(74) *Attorney, Agent, or Firm* — Boyle Fredrickson, S.C.

(57) ABSTRACT

A system for selecting one of multiple paths in a linear drive system includes track segments having a first drive member and at least one mover having a second drive member for the linear drive system. Each mover includes a drive surface oriented toward the track segment when the at least one mover is driven along the track. Each mover also includes a first channel and a second channel extending along the drive surface. A switch track segment includes a first path and a second path along which the at least one mover may travel, at least one first pin positioned along the first path, and at least one second pin positioned along the second path. The first and second pins are extendable to engage the first and second channels of the at least one mover to direct the mover along either the first path or the second path, respectively.

20 Claims, 22 Drawing Sheets

(51) Int. Cl.
*B65G 35/06* (2006.01)
*H02P 1/00* (2006.01)
*H02P 3/00* (2006.01)
*H02P 5/00* (2016.01)

(58) Field of Classification Search
USPC .......................................................... 318/135
See application file for complete search history.

(56) References Cited

U.S. PATENT DOCUMENTS

| | | |
|---|---|---|
| 9,032,880 B2 | 5/2015 | King et al. |
| 10,717,365 B2 | 7/2020 | Huang et al. |
| 10,923,997 B2 | 2/2021 | Hoeck et al. |
| 11,492,211 B1 * | 11/2022 | Bray ....................... B65G 54/02 |
| 2016/0231553 A1 * | 8/2016 | Piestun ................ G02B 21/367 |
| 2016/0244271 A1 * | 8/2016 | Walter ................. B65G 47/715 |
| 2019/0256302 A1 * | 8/2019 | Neubauer ................ H02K 7/08 |

OTHER PUBLICATIONS

Magnemotion, Inc., a Rockwell Automation Company; "QuickStick 100 User Manual"; DIR 990000460—www.rockwellautomation.com; Rockwell Automation Publication MMI-UM006G-EN-P—Jan. 2020—(232) pages.

* cited by examiner

SYSTEM AND METHOD FOR CONTROLLING DIRECTION OF A VEHICLE IN AN INDEPENDENT CART SYSTEM

BACKGROUND INFORMATION

The subject matter disclosed herein relates to controlling direction of a vehicle in an independent cart system. More specifically, systems and methods for selecting a desired track, from among multiple available branches, along which a vehicle, controlled by a linear drive system, will travel are disclosed.

Motion control systems utilizing movers and linear drives in an independent cart system can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled carts, or "movers," each supported on a track for motion along the track. The track is made up of a number of track segments that, in turn, hold individually controllable electric coils. Successive activation of the coils establishes a moving electromagnetic field that interacts with the movers and causes the mover to travel along the track.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

In some applications, a track may include multiple paths along which the mover may travel. The track must include a switch section in order to permit a mover to travel along the desired path. A switch section will typically include a single input path and two or more output paths. A corresponding switch section may similarly be connected at the end of multiple paths, allowing for multiple input paths and a single output path where the divergent paths rejoin into a single path. Historically, a rail-type system may include a rotary switch, where a switch is initially aligned along a desired input path such that a mover may drive onto the switch. The mover comes to a complete stop on the switch, the switch rotates to a desired output path, and the mover resumes travel along the new path. The rotary switch, however, is not without certain disadvantages. The rotary switch decreases the overall throughput in a system. A mover must come to a complete stop on the switch and wait for the switch to align with the new desired path before resuming travel. Multiple delays are introduced due to the mover decelerating to a stop, the switch rotating, and the mover accelerating back up to a desired speed.

Alternately, it is known to provide a diverter arm along a conveyor system to select one of two paths along which objects may travel. The diverter arm is selectively positioned in a first position to route objects along a first path and in a second position to route objects along a second path. The diverter arm, however, is not without certain disadvantages. The diverter arm takes time to transition between the first and second positions. The track must be clear of a leading object before the diverter arm is able to move between positions, such that the diverter arm does not interfere with the leading Object traveling along its desired path. Therefore, objects must be spaced out along the track a sufficient distance to permit travel of the diverter atm between the two positions. In addition, a diverter arm must travel at least the width of the track as it transitions between the first position and the second position. As the size of the track increases, the time required for the diverter arm to transition between positions increases.

Thus, it would be desirable to provide an improved system and method of selecting a desired path along which a vehicle in an independent cart system may travel.

It would further be desirable to provide an improved system of selecting a desired path which complements the high-speed motion of the linear drive system for the independent cart system.

BRIEF DESCRIPTION

According to one embodiment of the invention, a system for selecting one of multiple paths in a linear drive system includes multiple track segments, at least one mover, and a switch track segment. Each track segment includes a first drive member for the linear drive system, and the at least one mover includes a second drive member for the linear drive system, where the first and second drive members engage each other to drive the at least one mover along the track segments. Each mover also includes a drive surface oriented toward the track segments when the mover is driven along the track segments, a first channel extending along the drive surface, and a second channel extending along the drive surface. The switch track segment includes a first path and a second path along which the at least one mover may travel. The switch track segment also includes at least one first pin positioned along the first path and at least one second pin positioned along the second path. The at least one first pin is extendable to engage the first channel of the at least one mover, and the at least one second pin is extendable to engage the second channel of the at least one mover. Either the first pin or the second pin is extended to direct the at least one mover along either the first path or the second path, respectively.

According to another embodiment of the invention, a system for selecting one of multiple paths in a linear drive system includes multiple track segments, at least one mover, and a switch track segment. Each track segment includes a first drive member for the linear drive system and at least one guide rail extending along the track segment. The at least one mover includes a second drive member for the linear drive system, where the first and second drive members engage each other to drive the mover along the track segments. Each mover also includes multiple guide wheels, where each guide wheel is configured to ride along the at least one guide rail for each track segment. The switch track segment includes a first path and a second path along which the at least one mover may travel. The switch track segment also includes at least one first extendable guide rail positioned along the first path, and at least one second extendable guide rail positioned along the second path. Either the at least one first extendable guide rail or the at least one second extendable guide rail is extended to direct the at least one mover along either the first path or the second path, respectively.

According to still another embodiment of the invention, a system for selecting one of multiple paths in a linear drive system includes multiple track segments, at least one mover, a switch track segment, at least one electromagnet, and at least one magnetically receptive device. Each track segment includes a first drive member for the linear drive system, and the at least one mover includes a second drive member for the linear drive system. The first and second drive members engage each other to drive the at least one mover along the track segments. The switch track segment includes a first path and a second path along which the at least one mover may travel. The at least one electromagnet is positioned on either the first path, the second path, or the at least one mover. The at least one magnetically receptive device is also positioned on either the first path, the second path, or the at least one mover. The at least one electromagnet and the at least one magnetically receptive device are configured to selectively direct the at least one mover along either the first path or the second path.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
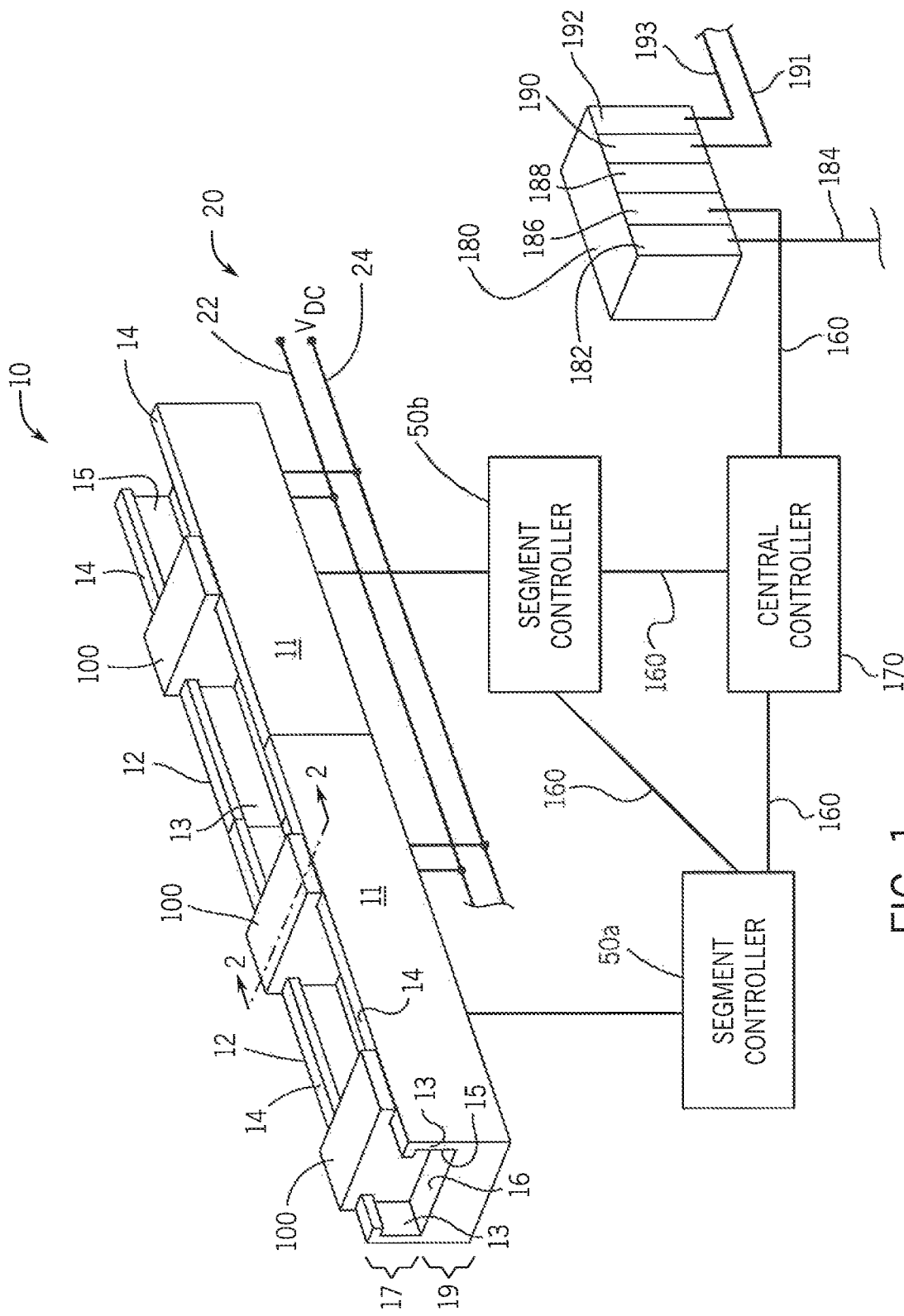
FIG. 1 is a schematic representation of an exemplary control system for an independent cart transport system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection hut include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes improved systems and methods of selecting a desired path along which a vehicle in an independent cart system may travel. According to a first embodiment of the invention, an improved diverter switch arm is provided. The improved diverter switch arm is constructed such that it is inertially balanced along the axis of rotation. The diverter arm extends in a first direction from a pivot point across the track such that the diverter arm may selectively direct a mover along the desired path. A counterweight is mounted to the diverter arm in a second direction from the pivot point, the second direction opposite the first direction. The counterweight provides an inertial balance for the diverter arm about the pivot point, and the inertial balance reduces loading on the switch bearing and improves rotation between an open and closed position. The diverter switch arm is also configured to engage a positive stop in at least a divert position. The positive stop reduces the holding force that must be applied by the actuator for the diverter switch arm and allows for increased payloads to be diverted by the switch arm compared to a diverter switch arm being held in place solely by the actuator. The positive stop may be positioned on either end or, in part, on both ends of the diverter arm. The end of the diverter arm extending across the track may include a portion which extends through a first opening in the side rail of the track when in a first position and through a second opening in the side rail of the track when in a second position. The portion of the diverter arm extending through the opening makes contact with a periphery of the opening, providing a positive stop for the diverter arm in each position. In addition, the pivot point may be located outside of the side rail near the divergence in paths. The counterweight at the opposite end of the diverter arm may be shaped such that a surface of the counterweight engages an outside surface of a side rail in each of the first and second positions, providing an alternate positive stop for the diverter arm in each position. The diverter arm is configured to engage the positive stop such that a mover applying a force to the diverter arm as the mover is directed along a desired path forces the diverter arm against the positive stop. The diverter arm is, therefore; configured to be self-locking when in the first or second positions and does not require the actuator to hold the diverter arm in position against a mover traveling along the desired path. Rather, the actuator is only required to transition the switch arm between the first and second positions.

According to another embodiment of the invention, an actuator, or a series of actuators, is provided on either the track or on each mover to selectively move between a first position and a second position. The actuator interacts with a complementary passive structure mounted on either the track or on each mover, where the track and each mover receive either the actuator or the passive structure. Interaction of the actuator with the complementary passive structure selects a desired path of travel for each mover. According to one aspect of the invention, a series of guide pins are positioned along the track. Each guide pin is configured to extend and retract such that it extends beyond the surface of the track and retracts even with or below the surface of the track. Each mover includes at least two channels extending along a lower surface of the mover. As a mover approaches a switch, guide pins extend along the desired path for the mover to travel. The guide pins engage one of the channels extending along the lower surface of the mover, directing the mover along the desired path.

According to another aspect of the invention, each mover includes a guide pin extending downward from the lower surface of the mover. Along segments of the track in which the mover has a single path to follow, the surface of the track may be displaced a sufficient distance from the mover relative to the guide pin such that there is no interference with travel. Optionally, a channel may extend along the length of track segment and be configured to receive the guide pin from the mover. At a switch, the surface of the switch includes a pair of channels, either of which is configured to receive the pin extending downward from the mover. A diverter in front of the switch directs the pin into one of the two channels. Once the pin is located within the channel, engagement of the pin with the channel directs the mover along the desired path.

According to still another aspect of the invention, each track segment may include rails extending along a length of the track. Each mover may include wheels configured to ride along the rail. A switch segment includes a pair of extendable rails. The extendable rails selectively raise above the surface of the track and retract even with or below the surface of the track. One of the extendable rails is formed to follow a first path and the other extendable rail is formed to follow a second path. As a mover approaches a switch, one of the extendable rails is raised and the other lowered. The guide wheels on the mover engage the raised rail and direct the mover along the desired path.

According to yet another aspect of the invention, a switch may include a series of electromagnets positioned along each branch of a switch. Each mover then includes a magnetic receptive structure located on the mover. As a mover approaches a switch, the electromagnets along one path of the switch are activated. It is further contemplated that the electromagnets are sequentially activated as the mover travels along a path such that only those electromagnets proximate the mover are active. The electromagnets generate an electromagnetic field that interacts with the magnetic receptive structure on the mover, directing the mover along the desired path. It is further contemplated that electromagnets may be mounted on each side of the mover and magnetic receptive structures mounted along each path of the switch. The electromagnet on one side of the mover is activated as the mover approaches the switch, and the energized electromagnet interacts with the magnetic receptive structures to direct the mover along the desired path. Each of the systems described briefly above will be discussed in more detail below and provides an improved system of selecting a desired path of travel for each mover which complements the high-speed motion of the linear drive system for the independent cart system.

Turning initially to FIGS. 1-4, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. In some applications, track segments 12 may be joined to form a generally closed loop supporting a set of movers 100 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The track may additionally include merging and diverging segments to either combine multiple paths into a single path or split a path into multiple paths, respectively. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a generally u-shaped channel 15 extending longitudinally along the upper portion 17 of each segment. The channel 15 includes a bottom surface 16 and a pair of side walls 13, where each side wall 13 includes a rail 14 extending along an upper edge of the side wall 13, The bottom surface 16, side walls 13, and rails 14 extend longitudinally along the track segment 12 and define a guideway along which the movers 100 travel. According to one embodiment, the surfaces of the channel 15 (i.e., the bottom surface 16, side walls 13 and rails 14) are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the housing of the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

According to the illustrated embodiment, each mover 100 is configured to slide along the channel 15 as it is propelled by a linear drive system. The mover 100 includes a body 102 configured to fit within the channel 15. The body 102 includes a lower surface 106, configured to engage the bottom surface 16 of the channel, and side surfaces 108 configured to engage the side walls 13 of the channel. The mover 100 further includes a shoulder 105 extending inward from each of the side surfaces 108. The shoulder 105 has a width equal to or greater than the width of the rail 14 protruding into the channel. A neck of the mover then extends upward to a top surface 104 of the body 102. The neck extends for the thickness of the rails such that the top surface 104 of the body 102 is generally parallel with the upper surface of each rail 14. The mover 100 further includes a platform 110 secured to the top surface 104 of the body 102. According to the illustrated embodiment, the platform 110 is generally square and the width of the platform 110 is greater than the width between the rails 14. The lower surface of the platform 110, an outer surface of the neck, and an upper surface of the shoulder 105 define a channel 115 in which the rail 14 runs. The channel 115 serves as a guide to direct the mover 100 along the track. It is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100. The platform 110 and any workpiece, clip, fixture, or other attachment present on the platform may define, at least in part, a load present on the mover 100.

The mover 100 is carried along the track 10 by a linear drive system. The linear drive system is incorporated in part on each mover 100 and in part within each track segment 12. According to the illustrated embodiment, drive coils 150 are positioned along the length of each track segment, and one or more drive members 120 are mounted to each mover 100. It is contemplated that the drive members may be drive magnets, steel hack iron and teeth, conductors, or any other suitable member that will interact with the electromagnetic fields generated by the coils 150 to propel each mover 100 along the track 10. For convenience, each drive member 120 will be discussed herein as a drive magnet. Alternately, it is contemplated that drive members 120 may be mounted along the length of each track segment and one or more drive coils 150 may be mounted to each mover 100 with the associated controllers to regulate current flow in each drive coil also mounted to each mover.

Figure 3:
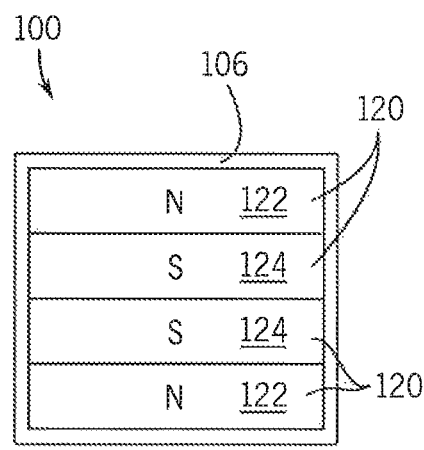
FIG. 3 is a bottom plan view of the exemplary mover of FIG. 2.
Figure 4:
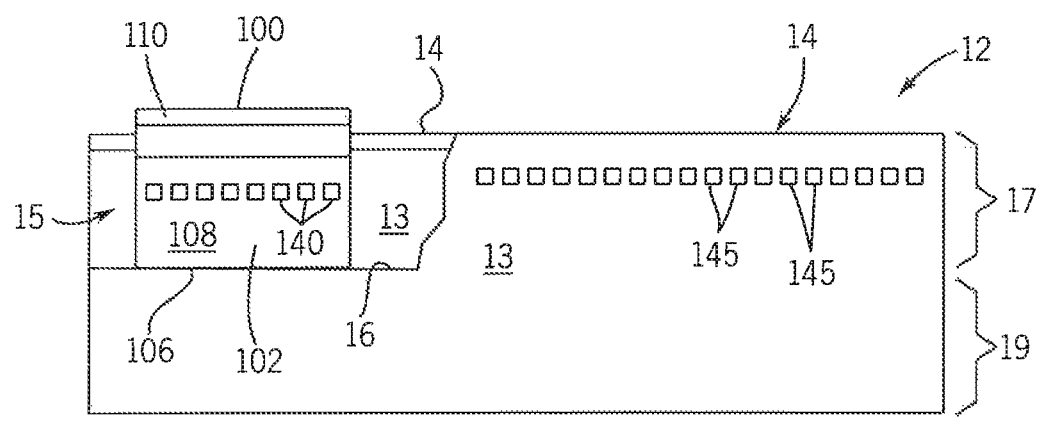
FIG. 4 is a partial side cutaway view of the mover and track segment of FIG. 2.

With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing outward from the mover. According to the illustrated embodiment, two positive magnet segments 122 are located on the outer sides of the set of magnets and two negative magnet segments 124 are located between the two positive magnet segments 122. Optionally, the positive and negative motor segments may be placed in an alternating configuration. In still other embodiments, a single negative magnet segment 124 may be located between the positive magnet segments 122. According to still another embodiment, the drive magnets 120 may utilize a Halbach array of magnets. The Halbach array inserts magnets rotated ninety degrees such that the north and south polarity of the rotated magnets appears as "east" or "west" to the other magnets. The effect of the rotation is to enhance the strength of the magnetic field along one side of the magnet array (i.e., the side facing the drive coils) and to reduce the strength of the magnetic field along the other side of the magnet array (i.e., the side facing away from the drive coils). Various other configurations of the drive magnets 120 may be utilized without deviating from the scope of the invention.

Figure 5:
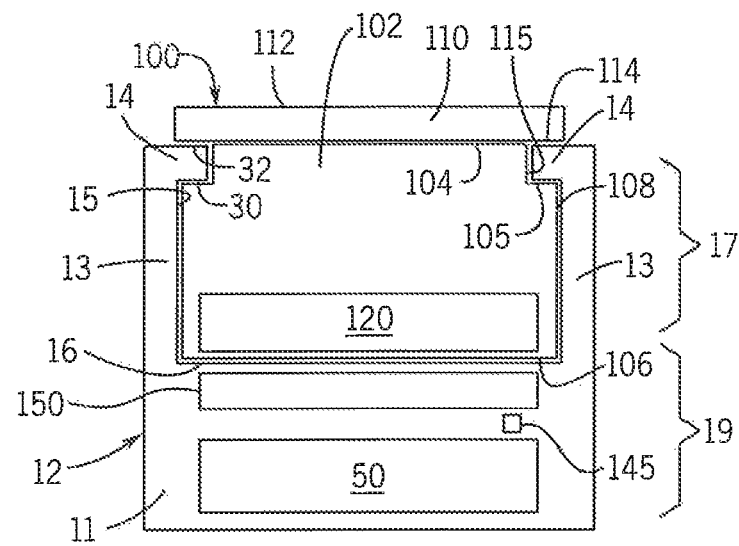
FIG. 5 is a sectional view of another embodiment of a mover and track segment included in the independent cart transport system taken at 2-2 of FIG. 1.
Figure 7:
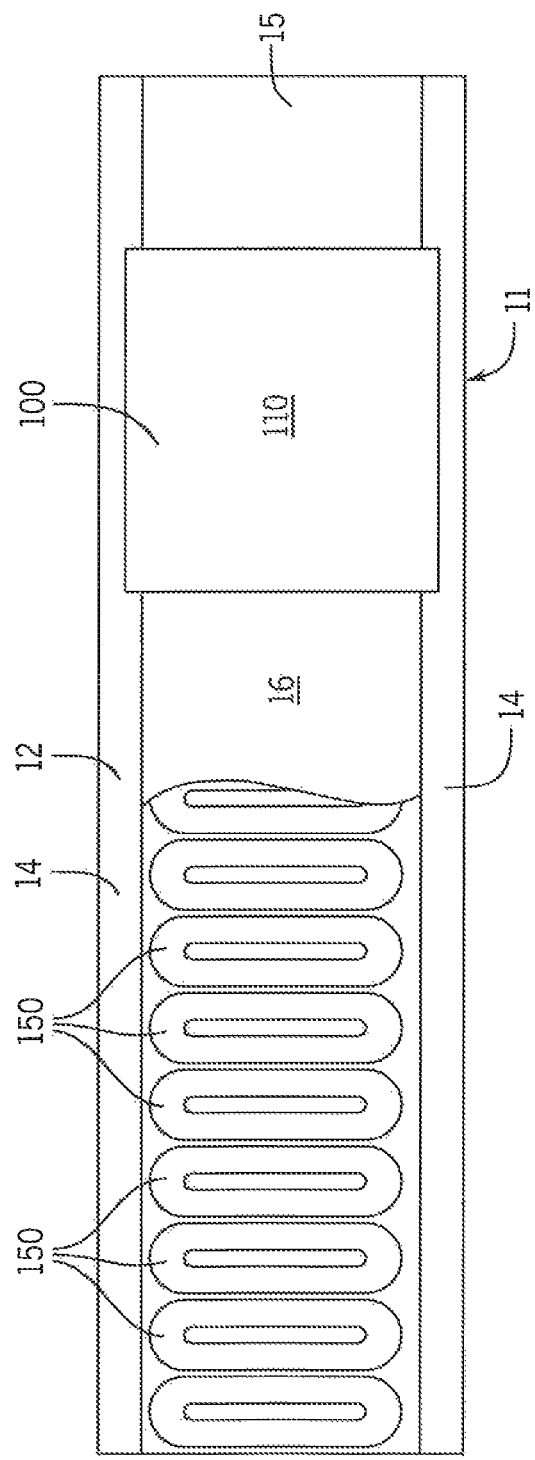
FIG. 7 is a partial top cutaway view of the mover and track segment of FIG. 2.

The linear drive system further includes a series of coils 150 spaced along the length of the track segment 12. With reference also to FIGS. 5 and 7, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

Figure 8:
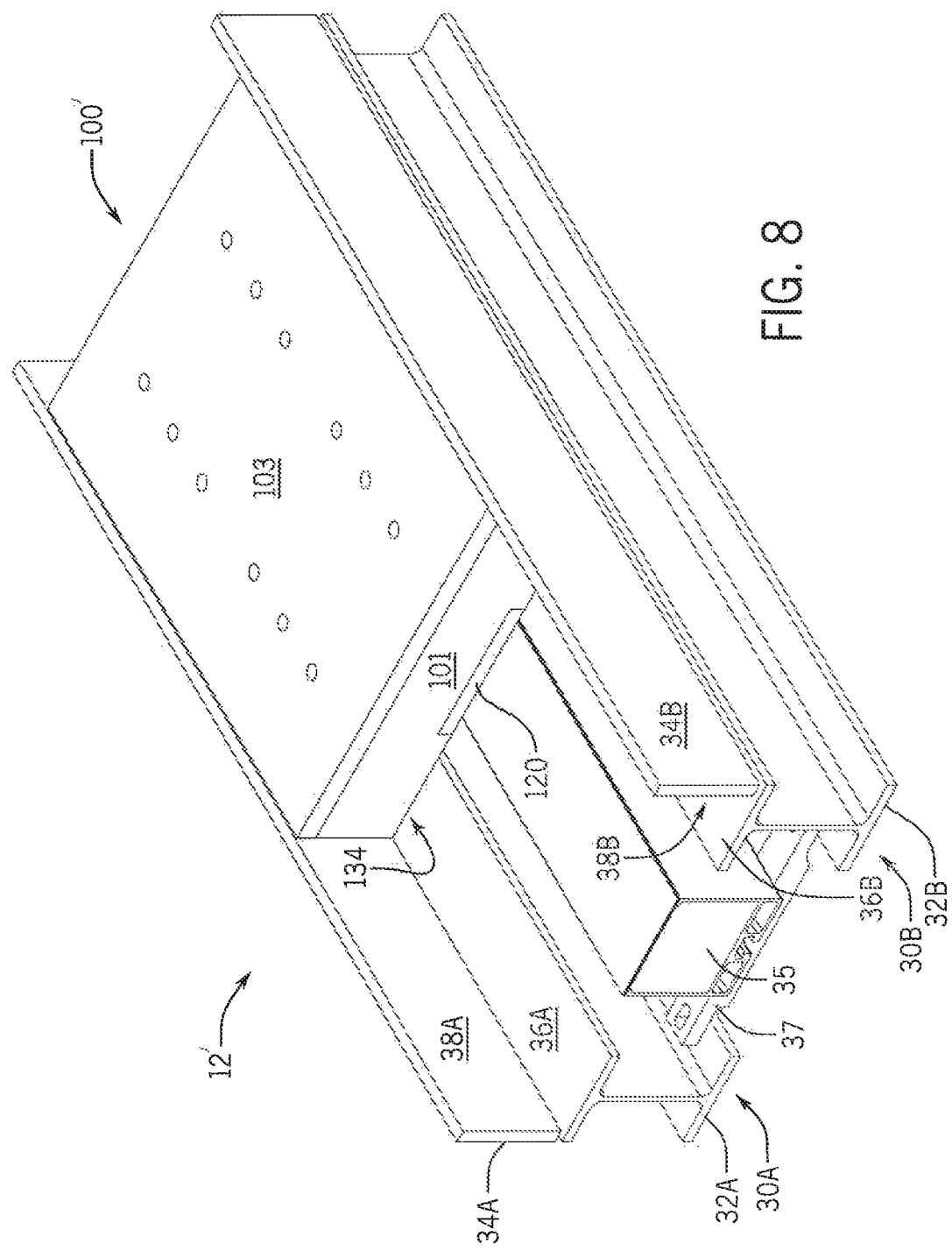
FIG. 8 is a perspective view of another embodiment of a mover and track segment of the independent cart transport system.

Referring next to FIG. 8, an alternate embodiment of a mover 100' and track segment 12' are illustrated. According to the embodiment illustrated in FIG. 8, each track segment 12' includes a first rail 30A and a second rail 30B. Each rail 30A, 30B includes a structural segment 32A, 32B and a guiding segment 34A, 34B, The illustrated structural segment 32 is an I-beam, and the illustrated guiding segment 34 is a metal side rail extending upward from the I-beam. By manufacturing each rail 30 independently, the independent cart system may easily be configured to accept movers 100' having different widths. The rails 30 are mounted in parallel along a desired path and at a desired spacing far the movers 100' according to an application's requirements. A series of mounting brackets 37 span the distance between the two rails 30 and a control module 35 is mounted on the mounting brackets 37. The control module 35 includes the coils 150 and a segment controller 50 for each track segment 12 mounted within the control module 35.

The mover 100' is configured to slide along an upper surface 36A, 36B of each I-beam 32A, 32B and is guided along the track by the inner surface 38A, 38B of each guiding segment 34A, 34B. The contacting surfaces of the movers 100' may be planar and made of a low friction material. It is contemplated that the surface may be, for example, nylon, Teflon®, aluminum, stainless steel and the like. In order to reduce sliding friction, it is contemplated that a sliding surface may protrude from the bottom of each mover 100' at the front and rear of each mover and along each side of the mover. The sliding surface may be, for example, a curved surface with a low profile, raising the mover 100' up a few millimeters to a few centimeters. The four sliding surfaces provide minimal contact with the top surface 36 of each I-beam, reducing the friction between the mover 100' and the I-beam. Similarly, one or more sliding surfaces may protrude from each side of the mover 100' to contact the side rails 30, reducing the friction between the mover 100' and each side rail. According to the illustrated embodiment, the mover 100' includes a body portion 101 and a mounting plate 103. The body portion 101 includes the drive member, such as the drive magnets 120, and any on-board control elements within the mover 100'. The mounting plate 103 is attached to the top of the body portion 101 and may be configured to include a fixture, or fixtures, for a payload to be mounted on the mover 100', tooling for interaction with a target external to the mover, or other sensors, actuators, and the like according to the application requirements. Connectors may be provided between the body 101 and the mounting plate 103 to provide control signals and/or feedback signals between the body 101 and the mounting plate 103. Drive magnets 120 are mounted along a bottom, drive surface 134 of the mover 100' such that they may engage the electromagnetic field generated by the coils 150 as they are energized by the segment controller 50.

Figure 9:
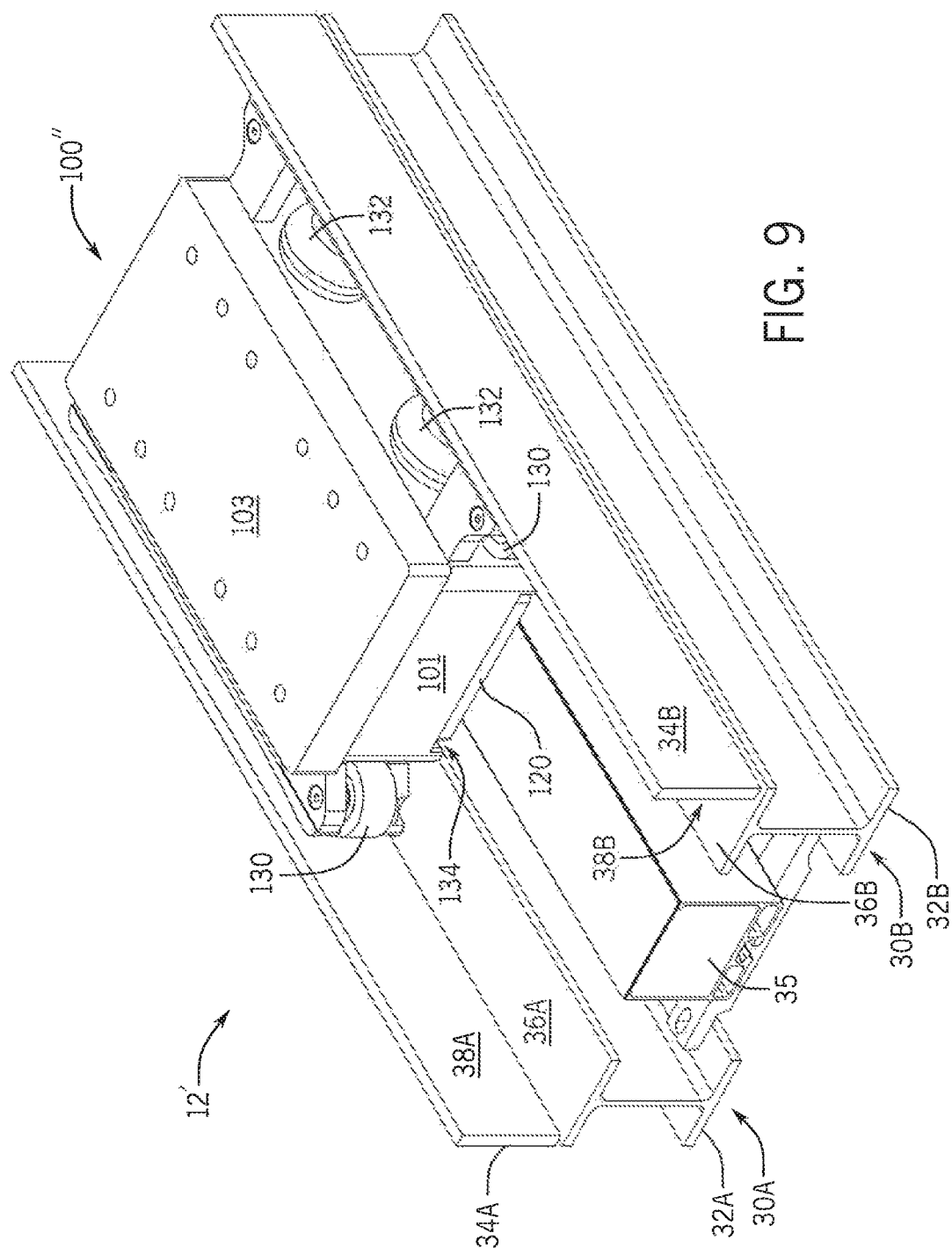
FIG. 9 is a perspective view of another embodiment of a mover with the track segment shown in FIG. 8 for the independent cart transport system.

Referring next to FIG. 9, still another embodiment of the mover 100" is illustrated. The mover 100" shown in FIG. 9 is configured to ride along the track segment 12' illustrated in FIG. 8. Rather than sliding along the upper surfaces 36A, 36B and between the inner surfaces 38A, 38B of each rail 30A, 30B, the mover 100" includes wheels 130, 132 configured to roll along the surface. A first set of wheels 130 is mounted horizontally and is configured to engage the inner surfaces 38A, 38B of each rail 30A, 30B. A second set of wheels 132 is mounted vertically and is configured to engage the upper surfaces 36A, 36B of each rail 30A, 30B.

Figure 2:
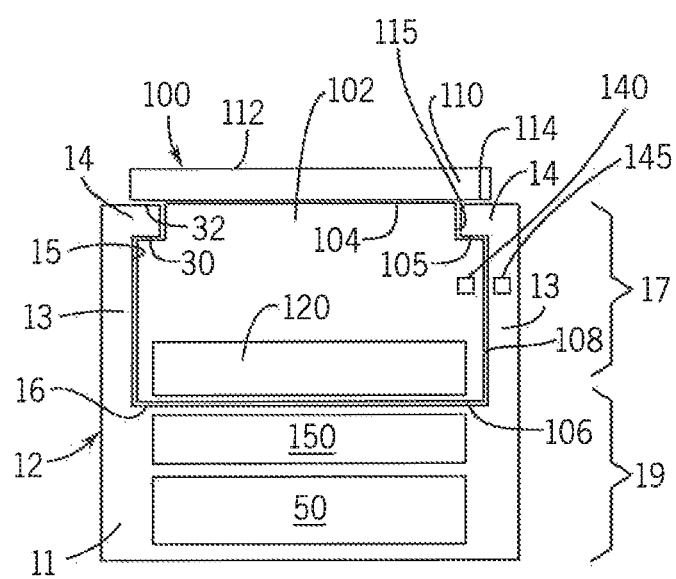
FIG. 2 is a sectional view of one embodiment of a mover and track segment included in the independent cart transport system taken at 2-2 of FIG. 1.

The segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. As shown in FIG. 2, it is contemplated that each segment controller 50 may be mounted in the lower portion 19 of the track segment 12. As discussed above with respect to FIGS. 8 and 9, the segment controller 50 may be mounted in a control module 35 mounted between rails 30. Each segment controller 50 is in communication with a central controller 170 which is, in turn, in communication with an industrial controller 180. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 180 includes: a power supply 182 with a power cable 184 connected, for example, to a utility power supply; a communication module 186 connected by a network medium 160 to the central controller 170; a processor module 188; an input module 190 receiving input signals 192 from sensors or other devices along the process line; and an output module 192 transmitting control signals 193 to controlled devices, actuators, and the like along the process line. The processor module 188 may identify when a mover 100 is required at a particular location and may monitor sensors, such as proximity sensors, position switches, or the like to verify that the mover 100 is at a desired location. The processor module 188 transmits the desired locations of each mover 100 to a central controller 170 where the central controller 170 operates to generate commands for each segment controller 50.

Figure 10:
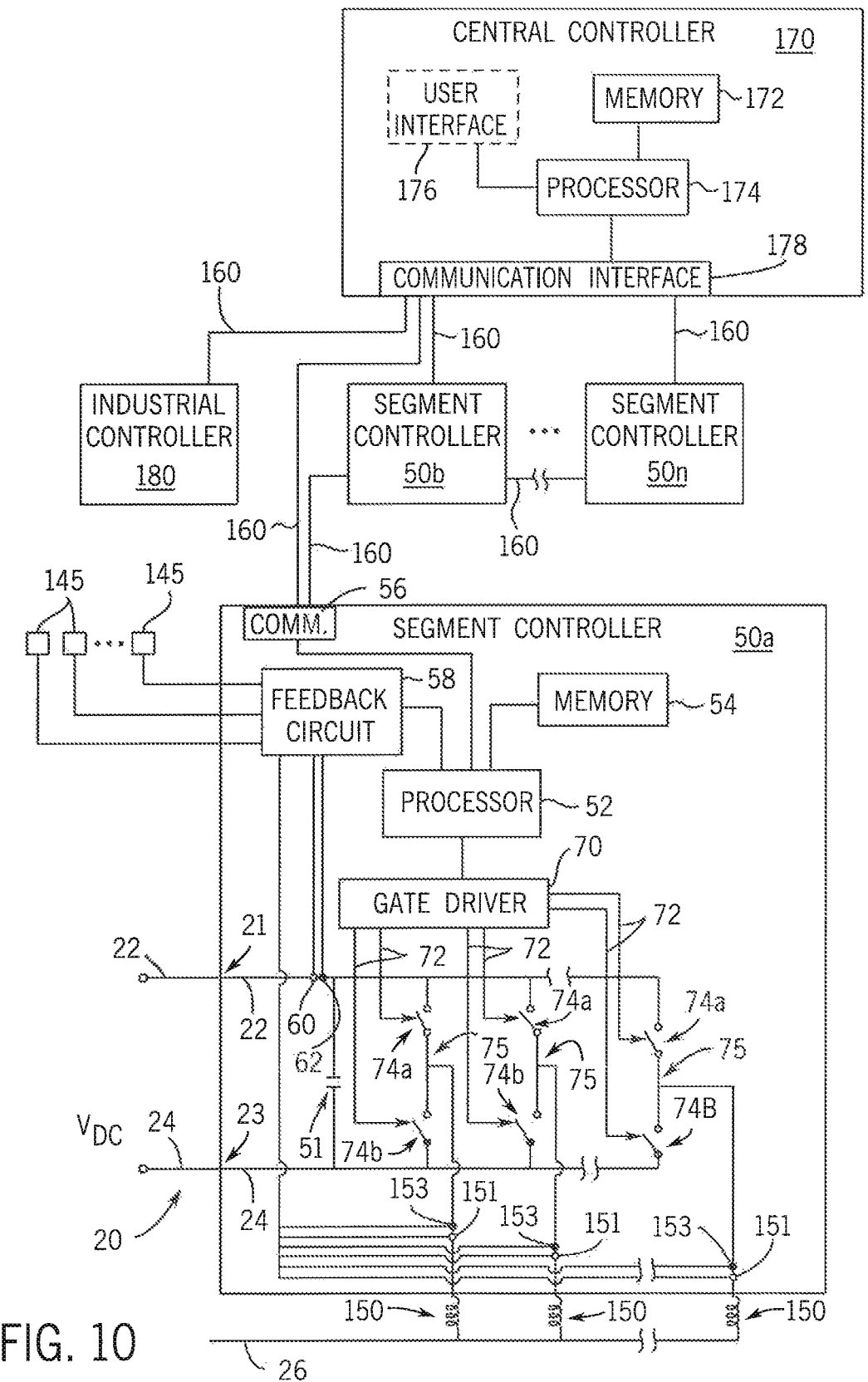
FIG. 10 is a block diagram representation of one embodiment of the exemplary control system of FIG. 1.

With reference also to FIG. 10, the central controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 receives a desired position from the industrial controller 180 and determines one or more motion profiles for the movers 100 to follow along the track 10. A program executing on the processor 174 is in communication with each segment controller 50 on each track segment via a network medium 160. The central controller 170 may transfer a desired motion profile to each segment controller 50. Optionally, the central controller 170 may be configured to transfer the information from the industrial controller 180 identifying one or more desired movers 100 to be positioned at or moved along the track segment 12, and the segment controller 50 may determine the appropriate motion profile for each mover 100.

A position feedback system provides knowledge of the location of each mover 100 along the length of the track segment 12 to the segment controller 50. According to one embodiment of the invention, illustrated in FIGS. 2 and 4, the position feedback system includes one or more position magnets 140 mounted to the mover 100 and an array of sensors 145 spaced along the side wall 13 of the track segment 12. The sensors 145 are positioned such that each of the position magnets 140 is proximate to the sensor as the mover 100 passes each sensor 145. The sensors 145 are a suitable magnetic field detector including, for example, a Hall-Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEW device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 5 which, in turn, provides a signal to the processor 52 corresponding to the magnet 140 passing the sensor 145.

Figure 6:
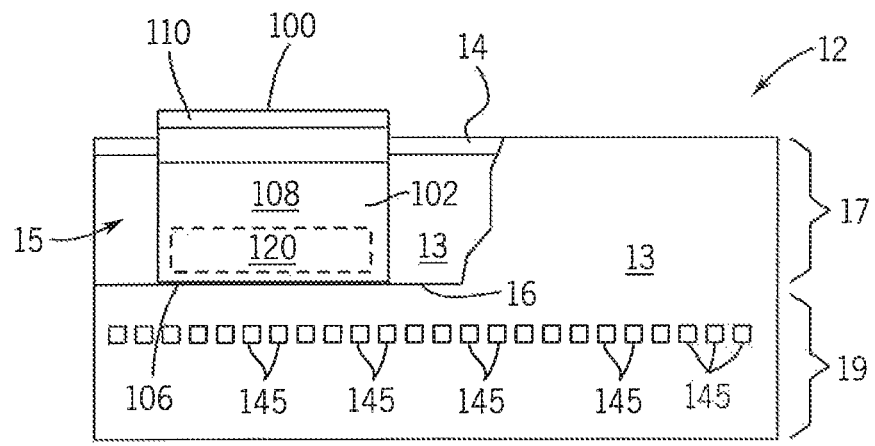
FIG. 6 is a partial side cutaway view of the mover and track segment of FIG. 5.

According to another embodiment of the invention, illustrated in FIGS. 5 and 6, the position feedback system utilizes the drive magnets 120 as position magnets. Position sensors 145 are positioned along the track segment 12 at a location suitable to detect the magnetic field generated by the drive magnets 120. According to the illustrated embodiment, the position sensors 145 are located below the coils 150. Optionally, the position sensors 145 may be interspersed with the coils 150 and located, for example, in the center of a coil or between adjacent coils. According to still another embodiment, the position sensors 145 may be positioned within the upper portion 17 of the track segment 12 and near the bottom surface 16 of the channel 15 to be aligned with the drive magnets 120 as each mover 100 travels along the tracks segment 12.

The segment controller 50 also includes a communication interface 56 that receives communications from the central controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100, The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices, Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 2.3 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at around potential and the negative rail 24 may have a DC voltage at a negative potential According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately providing positive or negative voltages to one the coils 150.

The power section in each segment controller 50 may include multiple legs, where each leg is connected in parallel between the positive rail 22 and the negative rail 24. According to the embodiment illustrated in FIG. 10, three legs are shown arranged in a half-bridge configuration. However, the number of legs may vary and will correspond to the number of coils 150 extending along the track segment 12. Each leg includes a first switching device 74a and a second switching device 74b connected in series between the positive rail 22 and the negative rail 24 with a common connection 75 between the first and second switching devices 74a, 74b. The first switching device 74a in each leg may also be referred to herein as an upper switch, and the second switching device 74b in each leg may also be referred to herein as a lower switch. The terms upper and lower are relational only with respect to the schematic representation and are not intended to denote any particular physical relationship between the first and second switching devices 74a, 74b. The switching devices 74 include, for example, power semiconductor devices such as transistors, thyristors, and silicon-controlled rectifiers, which receive the switching signals 72 to turn on and/or off Each of switching devices may further include a diode connected in a reverse parallel manner between the common connection 75 and either the positive or negative rail 22, 24.

Figure 11:
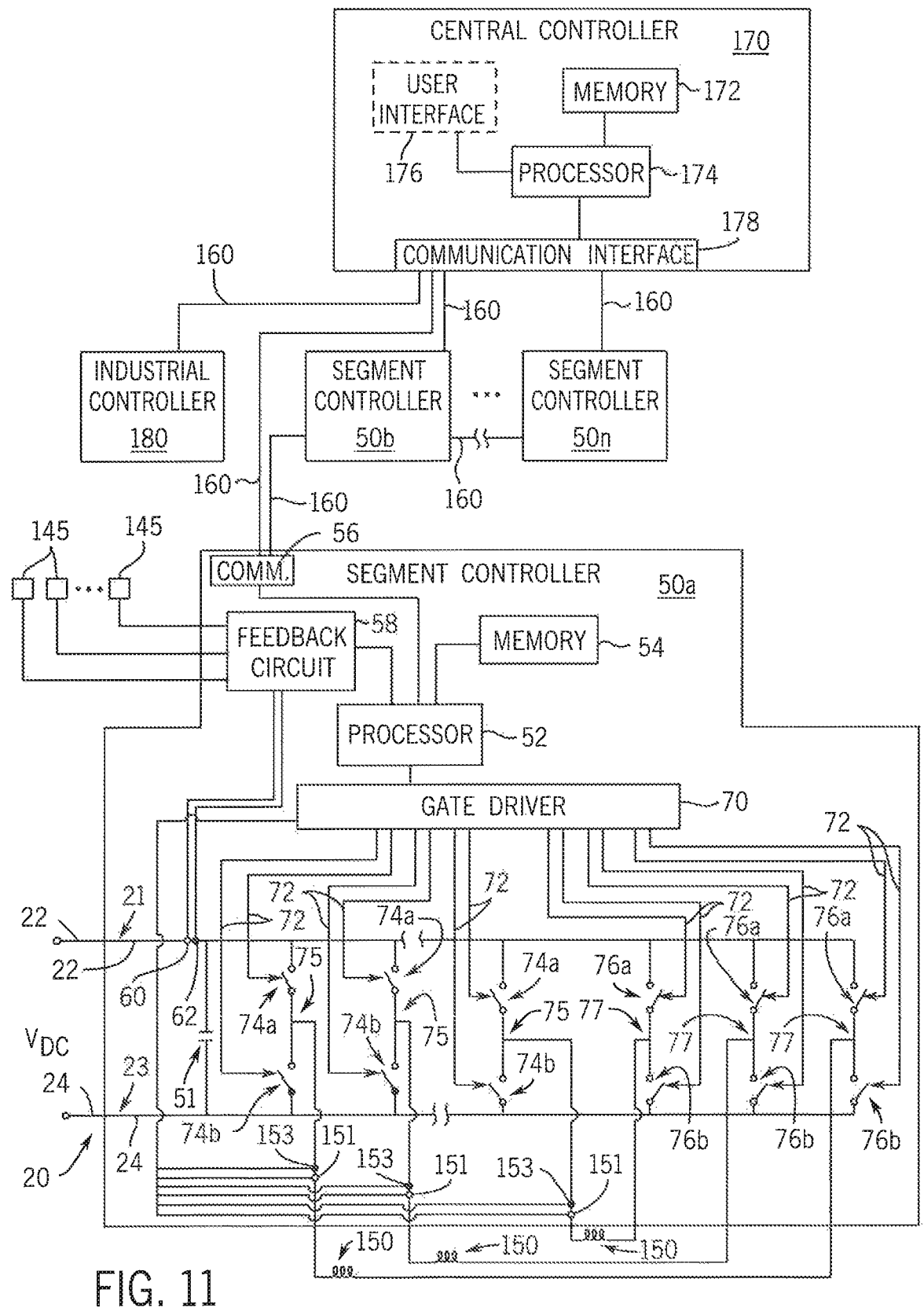
FIG. 11 is a block diagram representation of another embodiment of the exemplary control system of FIG. 1.

According to the embodiment illustrated in FIG. 11, three legs are shown arranged in a full-bridge configuration. Again, the number of legs may vary and will correspond to the number of coils 150 extending along the track segment 12. Each leg includes a first switching device 74a and a second switching device 74b connected in series on one side of the coil 150. The first and second switching devices 74a, 74b are connected between the positive rail 22 and the negative rail 24 with a first common connection 75 between the first and second switching devices 74a, 74b. The first common connection 75 is connected to the first side of the coil ISO. Each leg further includes a third switching device 76a and a fourth switching device 76b connected in series on the other side of the coil 150. The third and fourth switching devices 74a, 74b are connected between the positive rail 22 and the negative rail 24 with a second common connection 77 between the first and second switching devices 74a, 74b. The second common connection 77 is connected to the second side of the coil 150. The first and third switching devices 74a, 76a in each leg may also be referred to herein as upper switches, and the second and fourth switching devices 74b, 76b in each leg may also be referred to herein as lower switches. The terms upper and lower are relational only with respect to the schematic representation and are not intended to denote any particular physical relationship between the switching devices. The switching devices 74, 76 include, for example, power semiconductor devices such as transistors, thyristors, and silicon-controlled rectifiers, which receive the switching signals 72 to turn on and/or off Each of switching devices 74, 76 may further include a diode connected in a reverse parallel manner between the first or second common connection 75, 77 and either the positive or negative rail 22, 24.

With reference again to FIG. 10, the processor 52 may also receive feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. With reference also to FIG. 11, it is contemplated that the feedback signals from the current sensor 151 and/or the voltage sensor 153 corresponding to the operation of the coils 150 may be provided to a dedicated current regulator device. As shown in FIG. 11, the feedback signals are provided directly to the gate driver 70 which would, in turn, regulate the current output to each coil and generate the switching signals 72 accordingly. The energized coils 150 create an electromagnetic field that interacts with the drive magnets 120 on each mover 100 to control motion of the movers 100 along the track segment 12.

Figure 12:
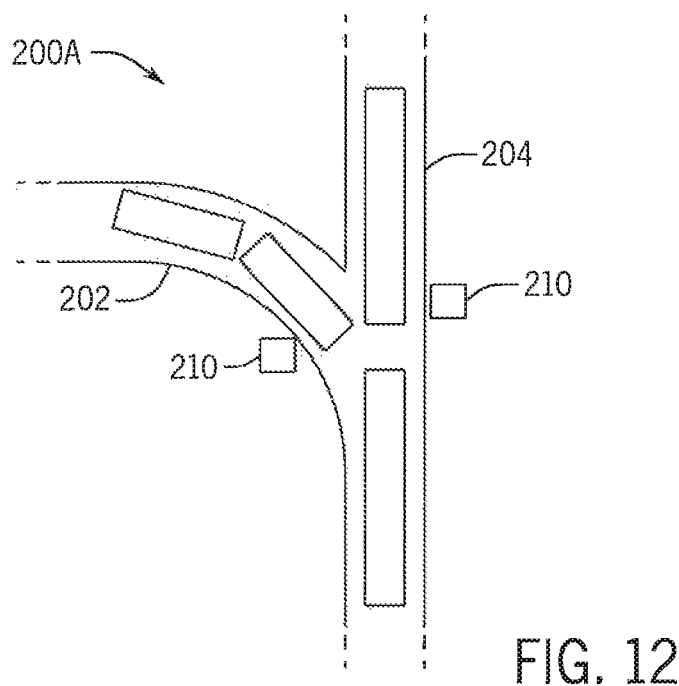
FIG. 12 is a top view of a two-way switch including a left-hand path and a straight path.
Figure 13:
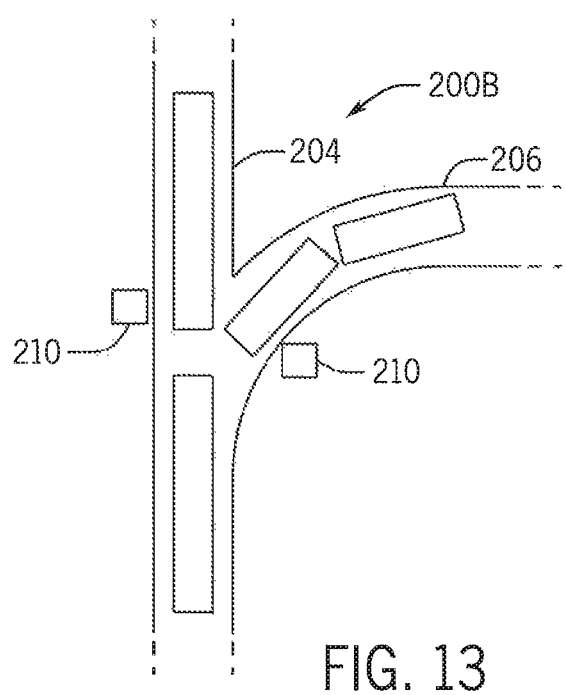
FIG. 13 is a top view of a two-way switch including a right-hand path and a straight path.
Figure 14:
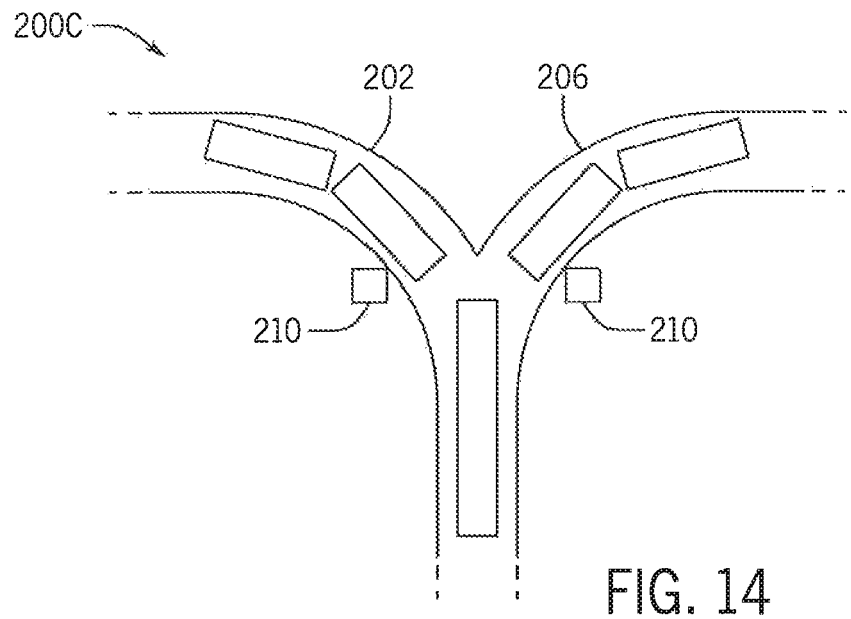
FIG. 14 is a top view of a two-way switch including a left-hand path and a right-hand path.
Figure 15:
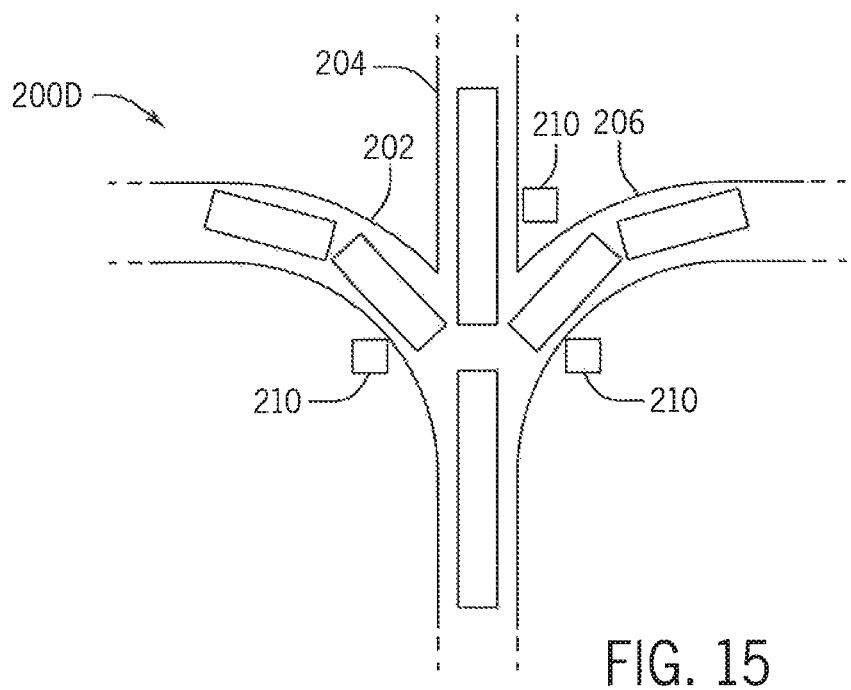
FIG. 15 is a top view of a three-way switch including a left-hand path, a right-hand path, and a straight path.
Figure 16:
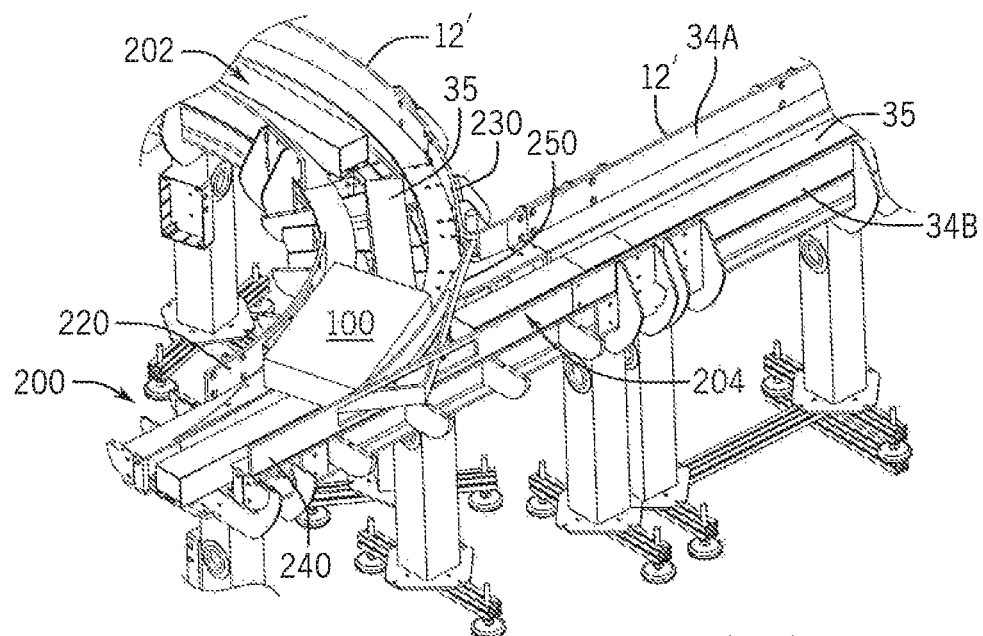
FIG. 16 is a perspective view of a track switch segment incorporating one embodiment of a path selection device with the path selection device shown in a first position.
Figure 17:
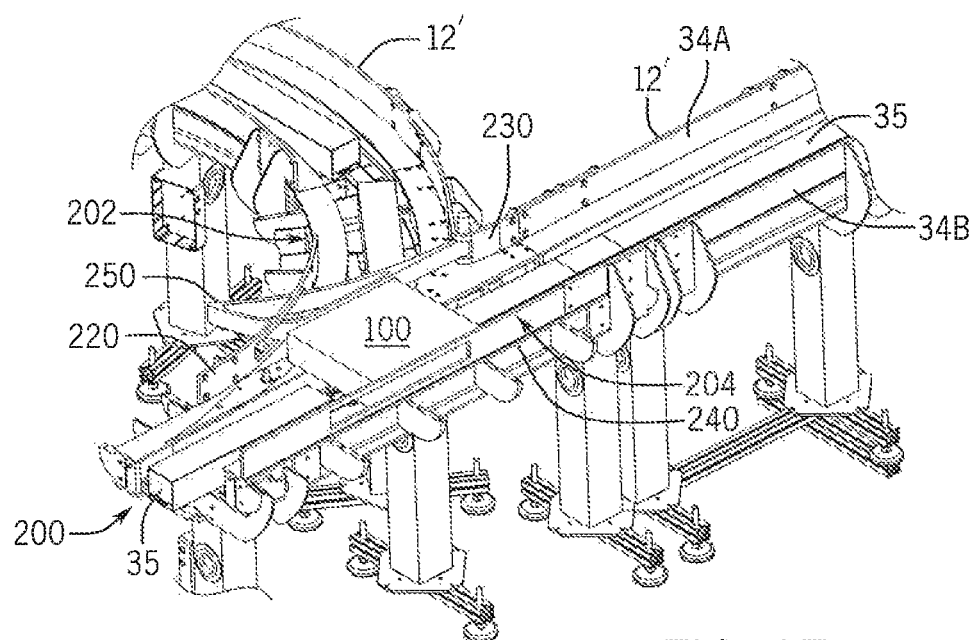
FIG. 17 is a perspective view of the track switch segment of FIG. 16 with the path selection device shown in a second position.

In operation, a mover 100 is driven along the track 10 by the linear drive system. The track 10 includes multiple paths along which the mover 100 may be directed. With reference to FIGS. 12-15, a number of different switch track segments 200 configurations may be provided to establish different paths. FIG. 12 illustrates a first switch track segment 200A with a left-hand path 202 and a straight path 204 as optional directions for the mover 100 to travel. FIG. 13 illustrates a second switch track segment 200B with a straight path 204 and a right-hand path 206 as optional directions for the mover 100 to travel. FIG. 14 illustrates a third switch track segment 200C with a left-hand path 202 and a right-hand path 206 as optional directions for the mover 100 to travel. FIG. 15 illustrates a fourth switch track segment 200D with a left-hand path 202, a straight path 204, and a right-hand path 206 as optional directions for the mover 100 to travel. Various combinations of switch track segments 200 may be included in a track layout according to an application's requirements.

Each switch track segment 200A-200D further shows a sensor 210 located along each path of the switch. According to one aspect of the invention, each sensor 210 is a magnetic sensor, such as a Hall-Effect sensor, a magneto-diode, an anisotropic magnetoresistive (AMR) device, a giant magnetoresistive (GMR) device, a tunnel magnetoresistance (TMR) device, fluxgate sensor, or another microelectromechanical (MEMS) device configured to generate an electrical signal corresponding to the presence of a magnetic field. As previously discussed, each mover 100 includes drive magnets 120 as a drive member for the linear drive system. The sensors 210 may be positioned along each path, such that the sensor 210 is able to detect the magnetic field generated by the drive magnets 120 as a mover 100 travels along a desired path. The sensor 210 generates a feedback signal for the segment controller 50, central controller 170, and/or industrial controller 180, the feedback signal corresponding to the presence of the drive magnets 120 proximate to the sensor 210. Each sensor 210 may be used to serve one or more functions. As a first function, the feedback signal is used to verify that each mover 100 has travelled along the desired path 202, 204, or 206. One of the controllers 50, 170, 180 is configured to control operation of a path selection device, as will be discussed in more detail below, to direct the mover 100 along the desired path. The controller 50, 170, 180 uses the feedback signal to verify the path selection device operated as desired and that the mover 100 followed the desired path.

According to another aspect of the invention, each sensor 210 may function as an independent position sensor to verify the location of a mover 100 along the track 10. As discussed above, the position feedback system includes sensors 145 arranged to detect position magnets 140. Alternately, the position sensors 145 may be arranged to detect drive magnets 120. It is contemplated that the path sensors 210 may also be configured to detect a mover's 100 position from the feedback signal generated by each path sensor 210. The path sensors 210 may be positioned to detect the drive magnets 120 or the position magnets 140 on each mover 100. The feedback signals from the path sensors 210 may be used both as a general verification that a mover 100 is travelling along a desired path as well as an independent verification of a position of the mover 100 along the track.

According to still another aspect of the invention, the path sensors 210 may further be configured to verify correct operation of the path selection devices. Each sensor 210 may be paired with a small electromagnet or other magnetic field generating device. The sensor 210 is positioned along the path such that the path selection device will create a first signature in the feedback signal when the path selection device is in a first position, or is present within the magnetic field, and a second signature in the feedback signal when the path selection device is in a second position, or is outside of the magnetic field. Thus, each sensor 210 may be utilized to determine in which state a path selection device is operating. The additional magnetic field generated by the drive magnets 120 or the position magnets 140 generate a different magnetic signature than the path selection device generates in either the first or second position. As a result, the sensors 210 may be used to detect the presence and/or location of a mover 100 along a desired path in addition to verifying operation of the path selection device.

Turning next to FIGS. 16-19, a first embodiment of a path selection device is illustrated. The track segments 12' used in FIGS. 16-19 correspond to the embodiment illustrated in FIGS. 8 and 9. The switch track segment 200 used in cooperation with the track segments 12' includes a series of modified rails 220, 230, 240 present along the edges of the switch. The illustrated embodiment corresponds to the first switch track segment 200A shown in FIG. 12 and has a left-hand path 202 and a straight path 204. It is contemplated the diverter arm 250 may be configured to work with the second switch track segment 200B, shown in FIG. 13, or the third switch track segment 200C shown in FIG. 14. Optionally, a pair of diverter arms 250 may be utilized to work with the fourth switch track segment 200D, shown in FIG. 15.

The path selection device includes a series of modified rails with mechanical stops to provide improved holding of the diverter arm 250 against higher payloads present on the mover 100. A first rail 220 for the switch track segment 200 is configured to be positioned along an outside edge of the left-hand path 202. The first rail 220 includes an opening 222 extending through a portion of the rail 220. An edge 224 of the opening 222 serves as a positive stop for the diverter arm 250 when the diverter arm is the second position, shown in FIGS. 17 and 19. A second rail 230 for the switch track segment 200 is configured to be positioned along the inside bend between the left-hand path 202 and the straight path 204. The second rail 230 includes an opening 232 through which the diverter arm extends as it pivots between the first and second positions. A third rail 240 for the switch track segment 200 is configured to be positioned along an outside edge of the straight path 204. The third rail 240 includes an opening 242 extending through a portion of the rail 240. An edge 244 of the opening 242 serves as a positive stop for the diverter arm 250 when the diverter arm is the first position, shown u FIGS. 16 and 18.

The diverter arm 250 is configured with an inertially balanced configuration to reduce strain on the shaft around which the arm pivots and to reduce the force required to pivot the diverter arm 250 between the first and second positions. The diverter arm 250 extends between a first end 252 and a second end 254. A first portion of the diverter arm 250 extends out over the track between a pivot 256 and the first end 252. A second portion 255 of the diverter arm 250 is located in the "v" formed between the inner portion of the left-hand path 202 and the straight path 204. The weight of the second portion 255 is selected to balance the weight of the first portion of the diverter arm 250. While the first portion of the diverter arm includes a first guide segment 251 and a second guide segment 253 extending across the track, the second portion 255 may be configured as a solid mass providing a counterbalance to the weight of the first and second guide segments 251, 253. In some embodiments of the invention, the second portion 255 of the diverter may also be configured to provide an additional positive stop for the diverter arm 250 in both the first and second positions. According to the illustrated embodiment, a first side wall 257 of the second portion 255 is generally planar and is configured to engage the inner surface of the second rail 230 extending along the straight path 204 when the diverter arm 250 is in the second position. The first side wall 257 provides an additional positive stop for the diverter arm 250 as it engages the inner surface of the second rail 230 along the straight path 204. A second side wall 259 of the second portion 255 is arcuate and is configured to engage the inner surface of the second rail 230 extending along the left-hand path 202 when the diverter arm 250 is in the first position. The second side wall 259 provides an additional positive stop for the diverter arm 250 as it engages the inner surface of the second rail 230 along the left-hand path 202.

The first portion of the diverter arm 250, extending from the pivot 256 to the first end 252 of the diverter arm, is configured to selectively direct a mover 100 along either the left-hand path 202 or the straight path 204 of the switch track segment 200. In the first position, the diverter arm 250 extends across and blocks the straight path 204 of the switch track segment 200. The first guide segment 251 has a curve complementary to the curve of the first rail 220 defining a path for the mover 100 to travel from the input of the switch track segment 200 to the left-hand path 202. In the second position, the diverter arm 250 extends across and blocks the left-hand path 202 of the switch track segment 200. The second guide segment 253 extends in a generally linear manner away from the pivot 256 for a majority of the span between the first rail 220 and the second rail 230 of the switch track segment 200. The second guide segment 253 then bends toward and joins the first guide segment 251 at the first end 252 of the diverter arm. The linear portion of the second guide segment 253 is generally parallel to the third rail 240 when the diverter arm 250 is in the second position defining a path for the mover 100 to travel from the input of the switch track segment 200 to the straight path 204 of the switch track segment 200.

An actuator is provided to move the diverter arm 250 about the pivot 256 between the first and second positions. Because the diverter arm 250 includes the second portion 255 providing a counterbalance to the first portion of the diverter arm, there is a little torque applied to the shaft due to gravity in a downward direction (when the switch track segment 200 is mounted in a horizontal orientation) that must be overcome. Consequently, the actuator is able to apply a torque in an axis of rotation about the pivot 256 to efficiently rotate the diverter arm 250 between the first and second positions.

Further, when the diverter arm 250 is in either the first or second positions, positive stops allow the diverter arm 250 to remain in the corresponding position without a holding torque due to the force of the mover 100 engaging the diverter arm. In the first position, the second guide segment 253 engages a side surface 244 of the opening 242 in the third guide rail 240. If so configured, the second side wall 259 of the second portion 255 of the diverter arm 250 also engages the inner surface of the second guide rail 230. As the mover 100 engages the diverter arm 250, the force of the mover 100 against the diverter arm 250 presses both surfaces against the respective stops causing the mover 100 to follow the path defined by the diverter arm 250 to the left-hand path 202. In the second position, the first guide segment 251 engages a side surface 224 of the opening 222 in the first guide rail 220. If so configured, the first side wall 257 of the second portion 255 of the diverter arm 250 also engages the inner surface of the second guide rail 230. As the mover 100 engages the diverter arm 250, the force of the mover 100 against the diverter arm 250 presses both surfaces against the respective stops causing the mover 100 to follow the path defined by the diverter arm 250 to the straight path 204.

Figure 18:
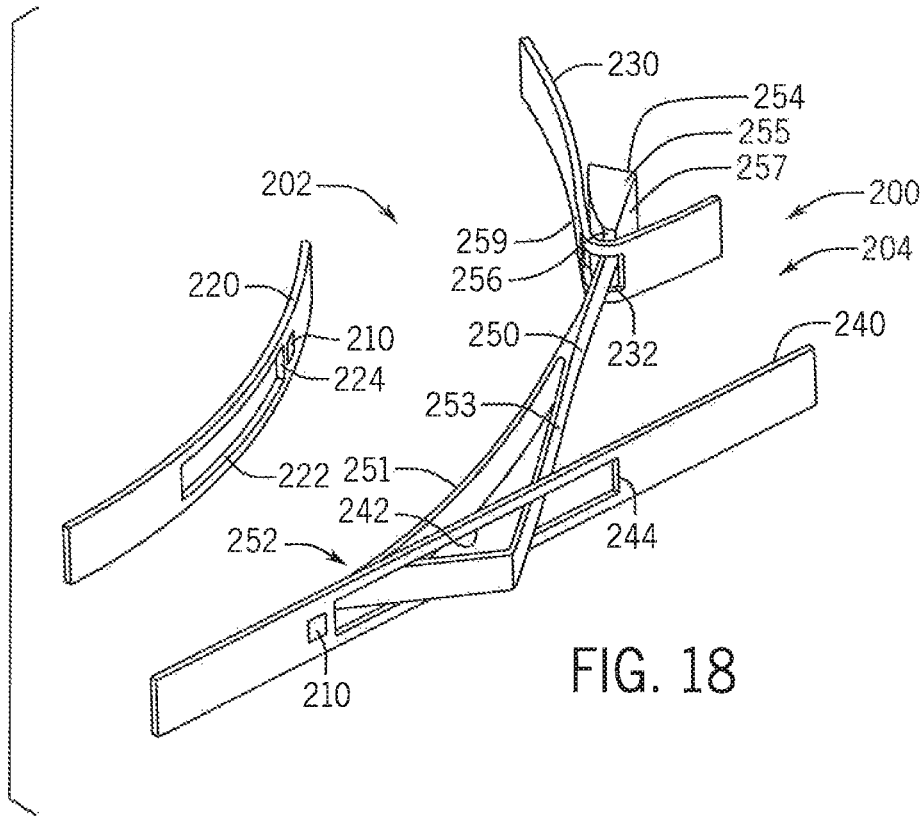
FIG. 18 is a perspective view of the path selection device of FIG. 16 with the path selection device shown in the first position.
Figure 19:
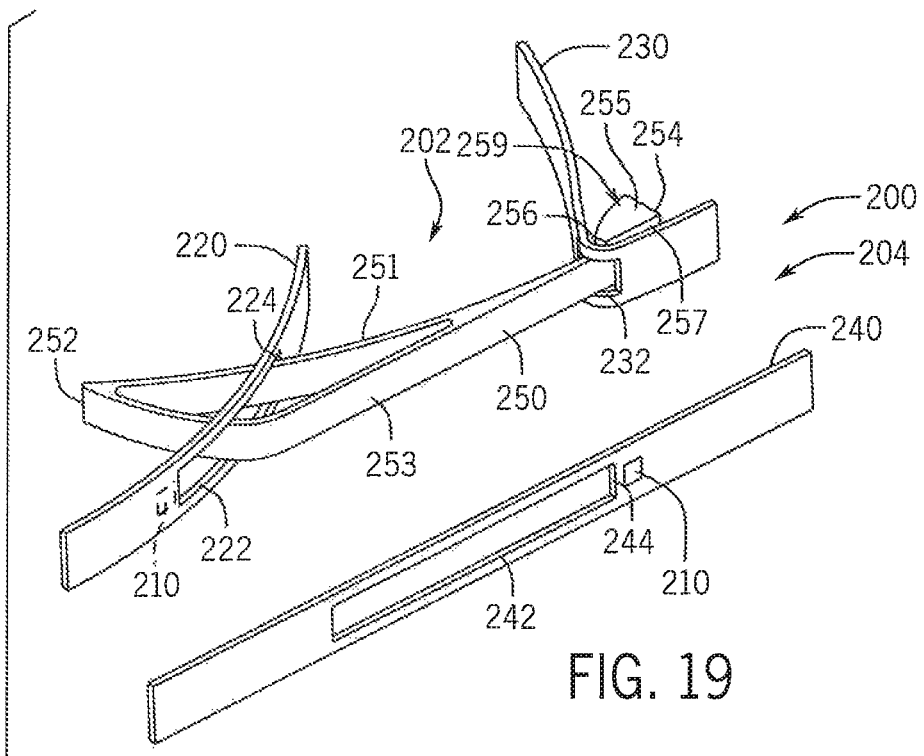
FIG. 19 is a perspective view of the path selection device of FIG. 16 with the path selection device shown in the second position.

Sensors 210 are mounted along the first guide rail 220 and the third guide rail 240 to verify operation of the diverter arm 250 and/or detect position of the mover 100 as it travels through the switch track segment 200. As shown in FIGS. 18 and 19, a sensor 210 may be mounted proximate the opening 222 in the first guide rail 220 and the opening 242 in the third guide rail 240. The sensor 210 generates a feedback signal having a first value when the diverter arm 250 is present in the opening 222, 242 proximate to the sensor and a second value when the diverter arm 250 is not present in the opening 222, 242 proximate to the sensor. The controller may use this feedback signal to verify correct operation of the diverter arm 250. As also discussed above, the sensor 210 may be configured to generate a signal as the mover 100 travels past the sensor. The feedback signal may vary as a function of the position of the mover 100 and the feedback signal from each sensor 210 may provide a redundant check on the position sensors 145 providing position information of each mover 100. Optionally, the feedback signal may simply be used to verify that the mover 100 has taken the desired path.

Figure 20:
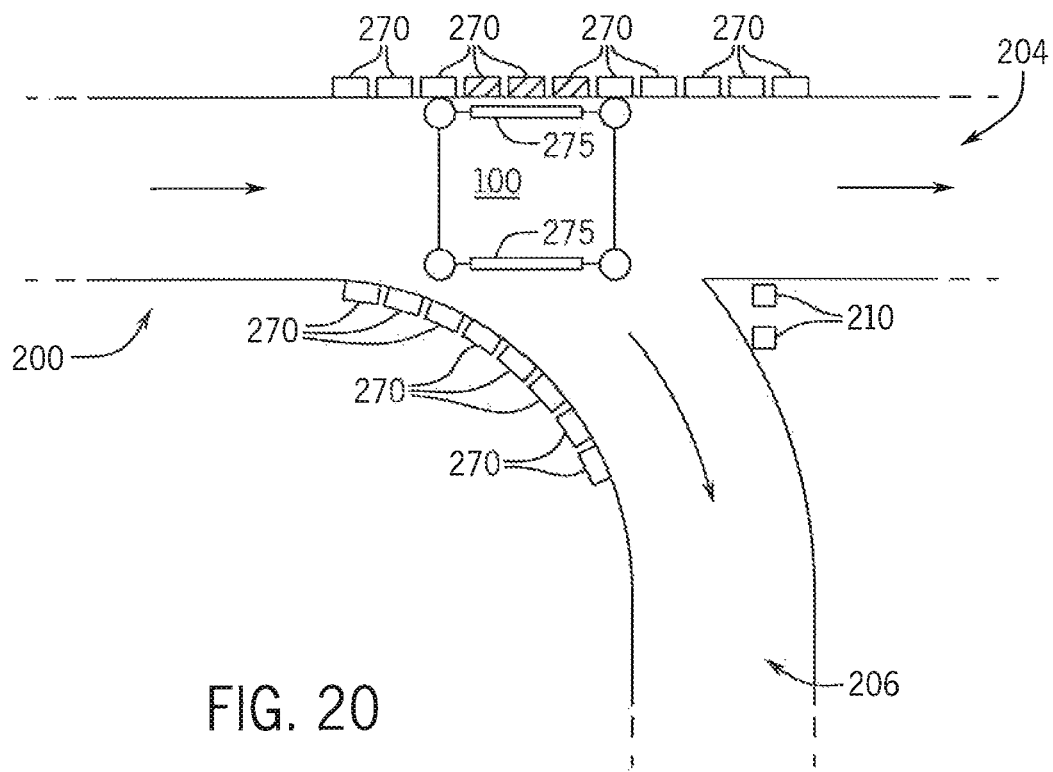
FIG. 20 is a top plan view of a track switch segment incorporating another embodiment of a path selection device with the path selection device selecting a first position.

Turning next to FIGS. 20-23, a second embodiment of a path selection device is illustrated. The illustrated embodiment uses electromagnets to select a path along which the mover 100 will travel. According to the illustrated embodiment, the switch track segment 200 includes a straight path 204 and a right-hand path 206. With reference to FIG. 20, a series of electromagnets 270 may be mounted along the side walls for both the straight path 204 and the right-hand path 206. As a mover 100 approaches the switch, the electromagnets 270 along one path are sequentially energized to draw the mover 100 toward the corresponding wall of the switch and direct the mover 100 along the desired path. The shaded blocks corresponding to electromagnets 270 in FIG. 20 represent energized electromagnets, and the unshaded blocks corresponding to electromagnets 270 represent unenergized electromagnets. The electromagnets 270 may first be energized closest to the input of the switch. As the mover 100 travels further along either the straight path 204 or the right-hand path 206, subsequent electromagnets 270 are energized along the desired path and adjacent to the mover 100. The electromagnets 270 behind the mover 100 are deenergized as the mover 100 travels past. Once the mover 100 has successfully traveled past each of the electromagnets 270 along one side or the other, according to the desired path, the mover 100 is again positioned between rails and continues moving along the desired path in the manner discussed above.

The electromagnets 270 are each made up of a coil 271 positioned along the rail 30 of the track segment 12'. According to the illustrated embodiment, a first portion 272 of the coil 271 is positioned along one side of a core 274 and a second portion 273 of the coil 271 is positioned along an opposite side of the core 274. According to the illustrated embodiment, the core 274 has a c-shaped sectional area. The first portion 272 and the second portion 273 of the coil 271 are joined at each end of the core 274 by end turns forming continuous loops of wire around the core 274. The dots illustrated in the first portion 272 of the coil 271 illustrate current flowing in one direction while the X's in the second portion 273 of the coil 271 illustrate current flowing in an opposite direction to the current in the first portion 272. An electromagnetic field is generated as a result of the current flowing through the coil 271.

Figure 22:
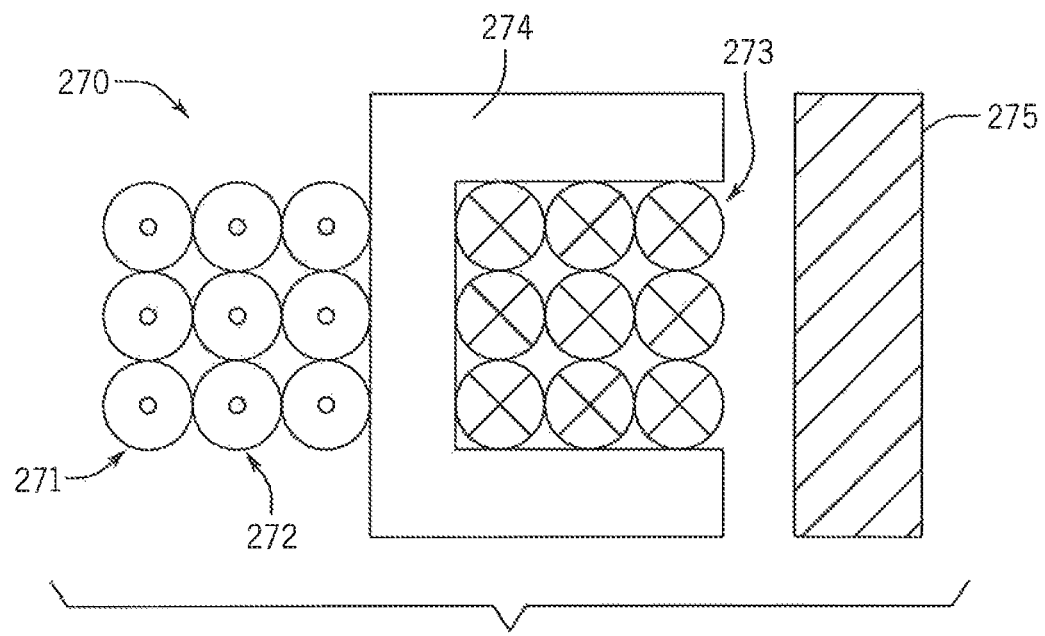
FIG. 22 is a partial sectional view of the track switch segment of FIG. 20 with a plate for mounting to a mover.

With reference first to FIGS. 20 and 22, a steel plate 275 may be mounted to each side of the mover 100. The steel plate 275 is magnetically receptive and is attracted to the electromagnetic field generated by the electromagnet 270. As a mover 100 travels along the switch track segment 200 sequential activation of the drive coils 150 propel the mover 100 along the switch track segment 200. Sequential activation of the electromagnets 270 coordinated with the activation of the drive coils 150 draws the mover 100 to one side of the switch track segment. A first steel plate 275 mounted on one side of the mover 100 is drawn toward the electromagnets along the straight path 204, and a second steel plate 275 mounted on an opposite side of the mover 100 is drawn toward the electromagnets along the right-hand path 206.

Figure 21:
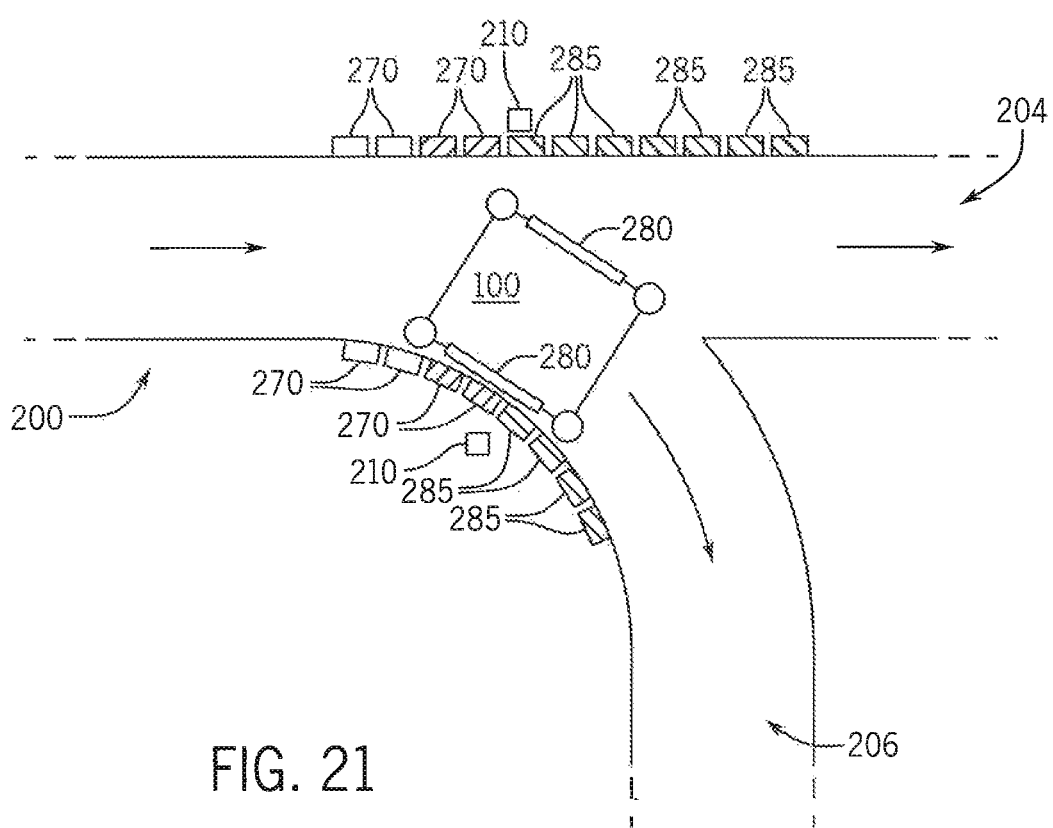
FIG. 21 is a top plan view of a track switch segment incorporating a modification of the path selection device of FIG. 20 with the path selection device selecting a second position.
Figure 23:
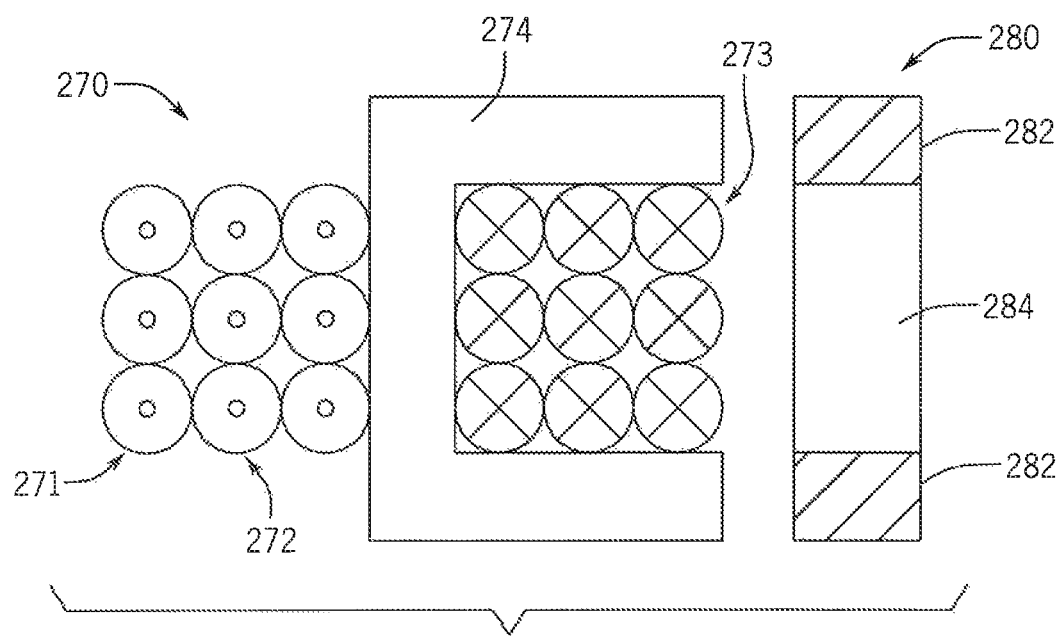
FIG. 23 is a partial sectional view of the track switch segment of FIG. 21 with a permanent magnet and steel segments for mounting to a mover.

With reference next to FIGS. 21 and 23, a magnetic structure 280 may be mounted to each side of the mover 100. The illustrated magnetic structure 280 includes a permanent magnet 284 mounted in the center of the structure 280 with a first steel member 282 mounted on top and a second steel member 282 mounted below the permanent magnet 284. Optionally, an array of permanent magnets may mounted on the mover 100 or multiple permanent magnets 284 may be spaced apart from each other and mounted along the side of each mover 100. The permanent magnet generates a continuous magnetic field that interacts with the electromagnetic field generated by each electromagnet. The polarity of the electromagnetic field generated by the electromagnets 270 is dependent on the direction of current flow through the coil 271. When the current flows in the direction indicated in FIG. 22, the polarities of the electromagnetic field are established in a first orientation. When the direction of current through the first portion 272 and the second portion 273 are reversed, the polarities of the electromagnetic field are established in second orientation, opposite the first orientation. The current in the electromagnets 270 may, therefore, be controlled to generate electromagnetic fields which will either attract or repel the permanent magnets 284 in the magnetic structure 280. A magnetic structure 280 is mounted to each side of the mover 100 and the electromagnets 270 along both sides of the switch track segment 200 are sequentially controlled in tandem to direct to the mover along the desired path. With reference to FIG. 21, the electromagnets 270 along the straight path 204 are controlled to generate an electromagnetic field which repels the permanent magnet 284 in the magnetic structure 280 mounted on the side of the mover 100 adjacent to straight path electromagnets. The electromagnets 270 along the right-hand path 206 are controlled to generate an electromagnetic field which attracts the permanent magnet 284 in the magnetic structure 280 mounted on the side of the mover 100 adjacent to the right-hand path electromagnets. The combination of the repulsive force on one-side of the mover 100 and the attractive force on the opposite side of the mover 100 creates a stronger force to direct the mover 100 along the desired path than may be obtained with similarly sized electromagnets acting only on a steel plate 275 on one side of the mover.

It is further contemplated that a portion of the electromagnets 270 may be replaced by magnetic receptive plates 285, such as steel plates, mounted along the rails of the switch track segment 200 with a magnetic structure 280 mounted on each side of the mover 100. As illustrated in FIG. 21, electromagnets 270 may be placed along the start of each path. When a mover 100 enters the switch area, the electromagnets 270 sequentially activate in the same manner as previously described, either along one side or along both sides to draw the mover 100 toward the desired path. When a magnetic structure 280 is mounted on a mover 100, the number of electromagnets 270 may be reduced. A series of magnetic receptive plates 285 are mounted along each path beyond the electromagnets 270. After initially diverting the mover 100 along either the straight path 204 or the right-hand path 206, the permanent magnet 284 mounted on the mover is attracted to the magnetically receptive plates 285 mounted along the rail and continues to draw the mover 100 toward the desired path of the switch. The electromagnets 270 may be positioned just far enough such that the mover 100 begins to enter the desired path. Once the front of the mover 100 is beyond the decision point between paths, the body of the mover 100 will tend to keep the mover 100 traveling along the selected path. The additional attractive force between the permanent magnet 284 in the magnetic structure 280 and the magnetically receptive plates 285 further ensure that the mover 100 continues travelling along the desired path.

Sensors 210 are mounted along the straight path 204 and the right-hand path 206 to verify operation of the electromagnets 270 and/or detect position of the mover 100 as it travels through the switch track segment 200. As shown in FIGS. 20 and 21, a sensor 210 may be mounted at various positions along the straight path 204 and the right-hand path 206. If mounted proximate the electromagnets 270, the sensor 210 generates a feedback signal having a first value when the electromagnets 270 are energized and a second value when the electromagnets 270 are deenergized. The controller may use this feedback signal to verify correct operation of the electromagnets 270. As also discussed above, the sensor 210 may be configured to generate a signal as the mover 100 travels past the sensor. The sensors 210 may be mounted at a position along each path with little or no feedback signal generated by the electromagnets. The feedback signal may vary as a function of the position of the mover 100 and the feedback signal from each sensor 210 may provide a redundant check on the position sensors 145 providing position information of each mover 100. Optionally, the feedback signal may simply be used to verify that the mover 100 has taken the desired path. According to still another aspect of the invention, sensors 210 may be mounted both to verify operation of the electromagnets 270 and detect the presence of the mover 100.

Figure 24:
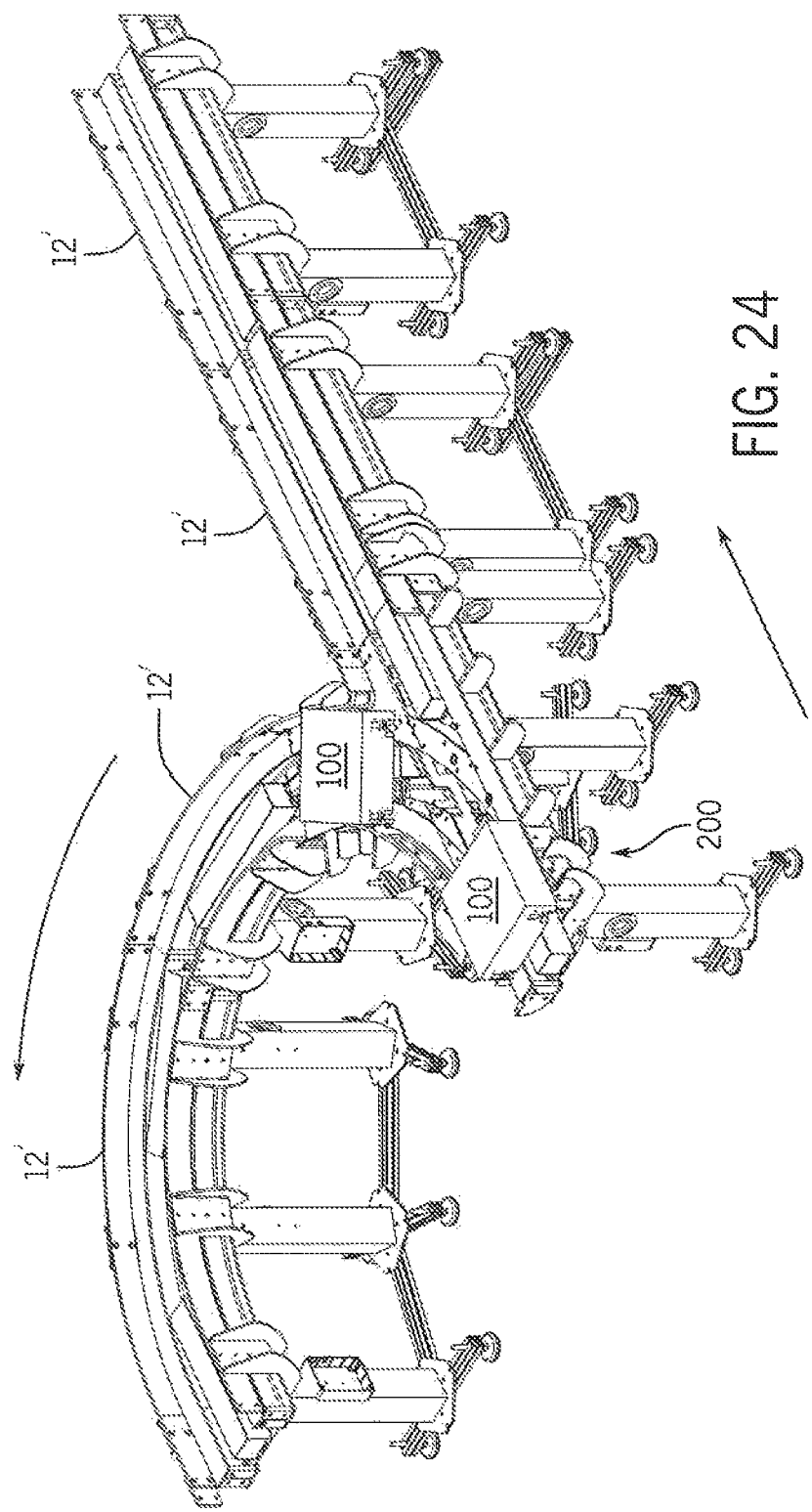
FIG. 24 is a perspective view of a switch track segment connected to additional track segments according to another embodiment of a mover and track segment of the independent cart transport system.
Figure 25:
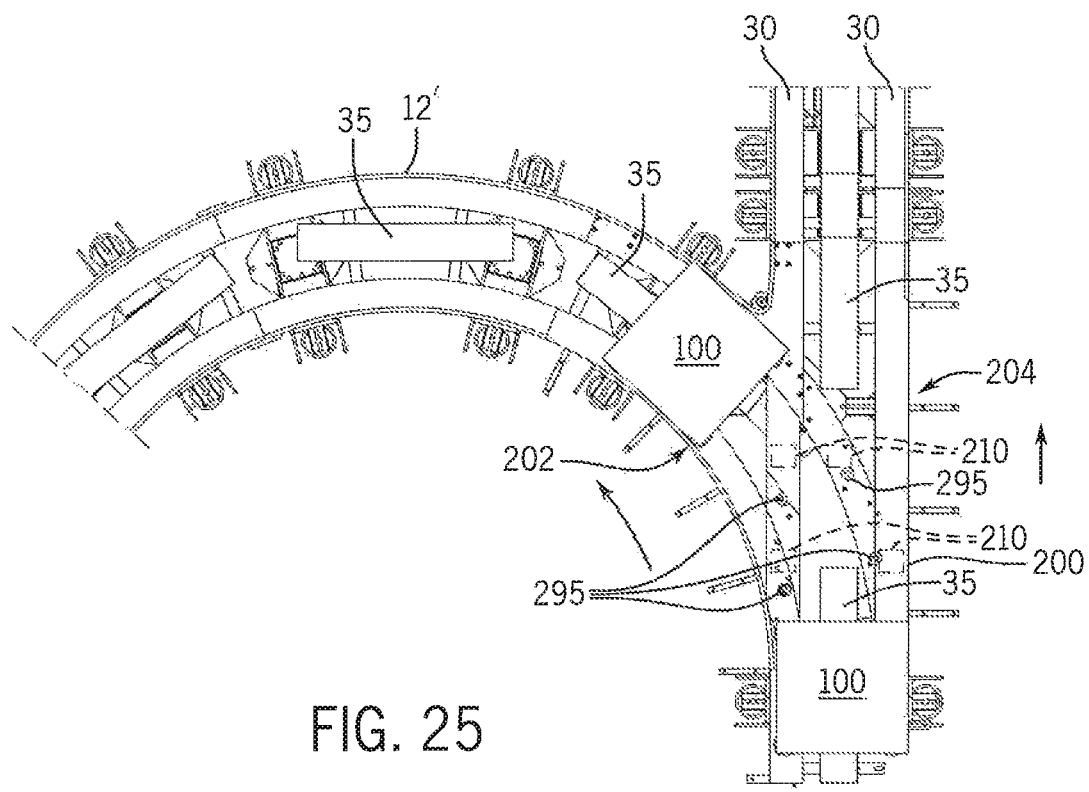
FIG. 25 is a top plan view of the track segments of FIG. 24.
Figure 26:
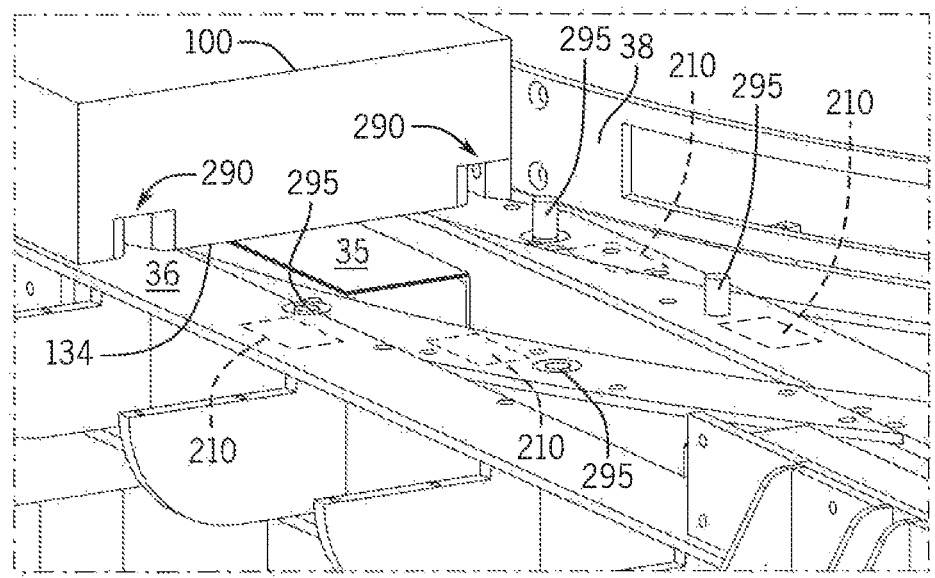
FIG. 26 is a partial sectional view of the switch track segment of FIG. 24.

Turning next to FIGS. 24-26, still another embodiment of a path selection device for a switch track segment 200 is illustrated. The path selection device utilizes a pin 295 and channel 290 system to select a desired path along which the mover 100 will travel. The illustrated embodiment shows a switch track segment 200 with a two-path switch. The switch track segment includes a left-hand path 202 and a straight path 204. A series of pins 295 are mounted within the rails 30 of the switch track segment 200. Each pin 295 is actuated to extend and retract. Each pin 295 may be separately actuated such that a pin 295 extends after a prior mover 100 passes over the pin 295 in one direction and before the next mover 100 to be diverted reaches the pin 295. Because each pin 295 has a small diameter and requires minimal movement, whether extension or retraction, the spacing between movers 100 may be reduced with comparison to a diverter arm 250 as discussed above. Optionally, multiple pins 295 may be actuated in tandem by a single actuator where each of the pins 295 actuated in tandem are used to direct a mover 100 along one of the desired paths. According to the illustrated embodiment, two pins 295 are provided along each of the paths. In FIG. 26, the two extended pins 295 will direct the mover 100 along the straight path 204. The two retracted pins 295 would be used to direct the mover 100 along the left-hand path 202. Each pin 295 is configured to engage a channel 290 present on the mover 100 as the Mover 100 is propelled along the switch track segment 200 by the linear drive system.

Figure 31:
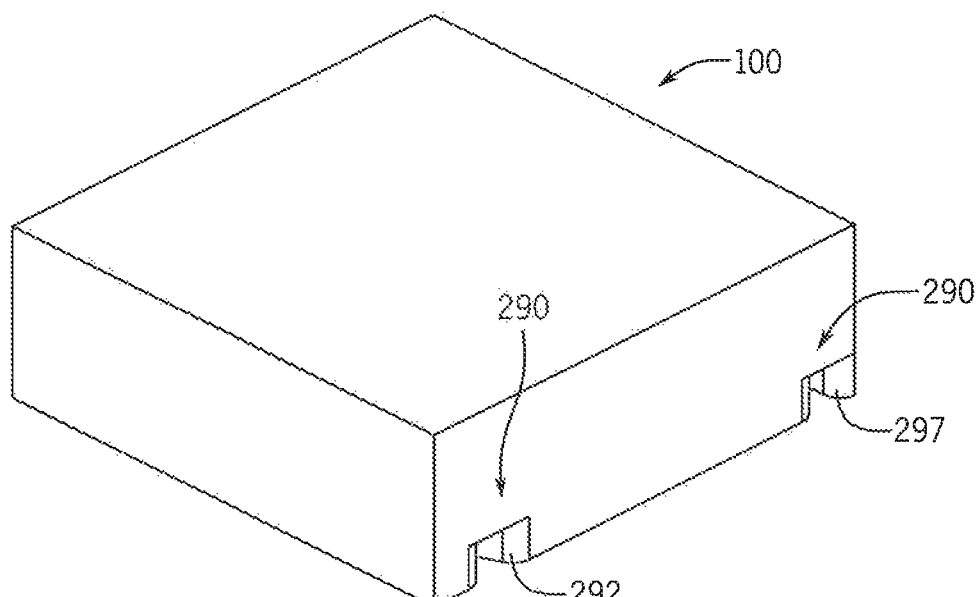
FIG. 31 is a perspective view of a mover taken from the front, top, and side for a switch track segment of the independent cart system of FIG. 24 with a two-way switch, including a straight-path and a left-hand path.
Figure 32:
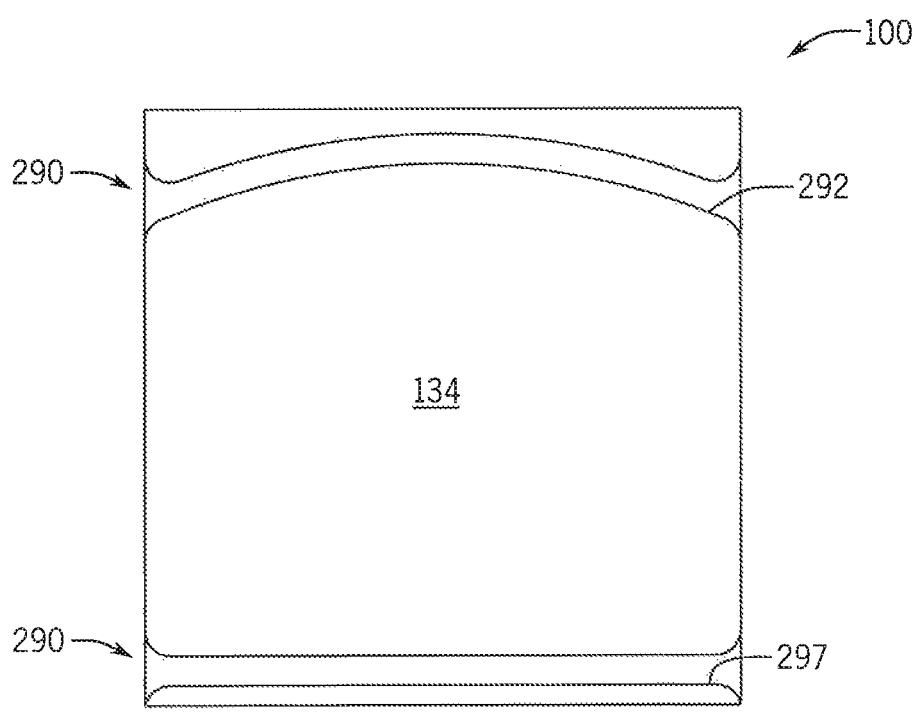
FIG. 32 is a bottom plan view of the mover of FIG. 31.
Figure 33:
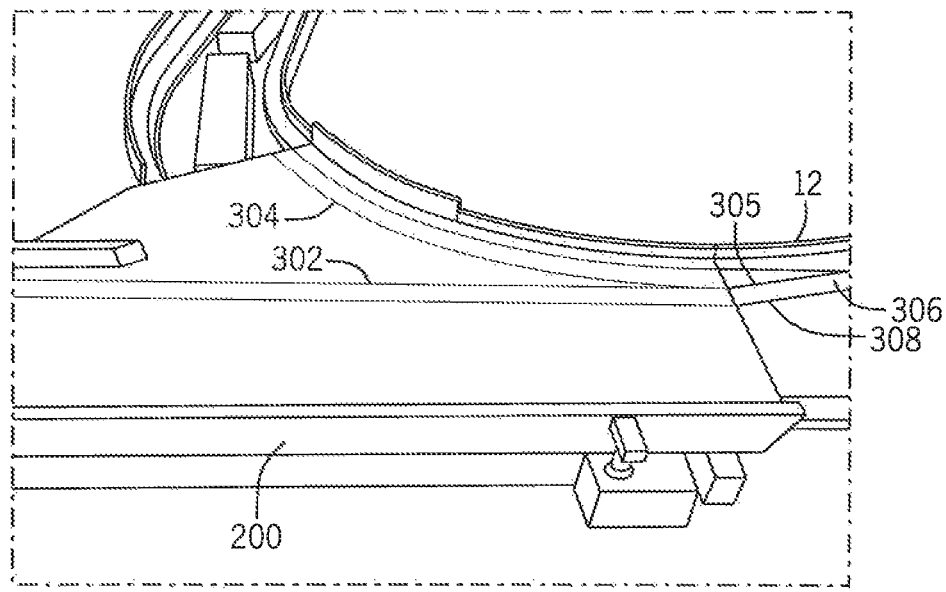
FIG. 33 is a view of another exemplary switch track segment from a top view and a side view.
Figure 34:
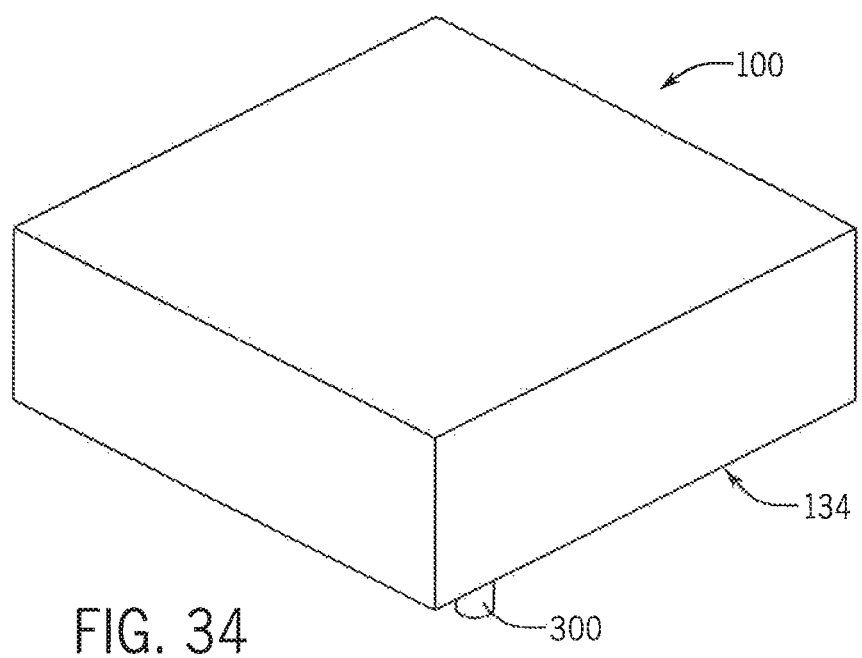
FIG. 34 is a perspective view of a mover configured to engage the switch track segment of FIG. 33.
Figure 35:
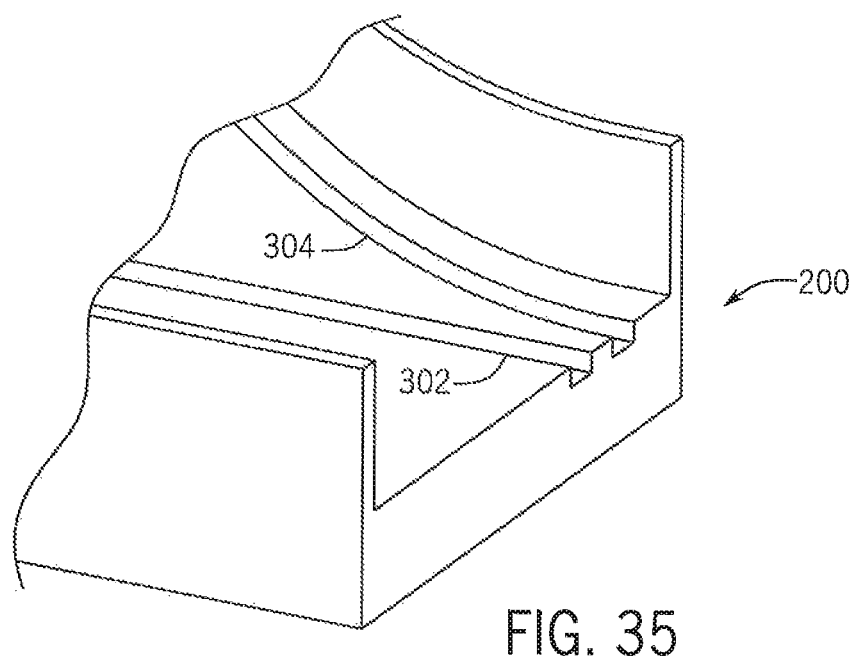
FIG. 35 is a perspective view of one end of the switch track segment of FIG. 33.

Turning next to FIGS. 31 and 32, a mover 100 used with the switch track segment 200 of FIGS. 24-26 is illustrated. The entrance to each channel 290 is curved or tapered to provide some tolerance for the channel 290 on the mover 100 engaging the pin 295 which is extended. As the mover 100 moves forward, the pin 295 fits within the channel 290 and causes the mover 100 to move according to the shape of the corresponding channel. As best seen in FIG. 32, the drive surface 134 of the mover 100 includes two channels 290. A first channel 297 is provided to move along the straight path 204. The first channel 297 is linear and causes the mover 100 to continue traveling straight through the switch area. A second channel 292 is provided to move along the left-hand path 202. The second channel 292 is located along the outside edge of the drive surface 134 and is curved. As the second channel 292 engages the first pin 295 for the left-hand path 202, the mover 100 begins to curve towards the left-hand path. The mover 100 is then positioned such that the second channel 292 hill similarly engage the second pin 295 for the left-hand path 202. The pair of pins 295 located within the second channel 292 will steer the mover 100 down the left-hand path. When the mover 100 has travelled a sufficient distance such that the second pin 295 exits the second channel 292, the mover 100 will be beyond the switch area and, at least in part, positioned over the control module 35 along the left-hand path 202, such that the control module 35 for the left-hand path 202 is able to continue driving the mover 100 along the left-hand path.

Figure 29:
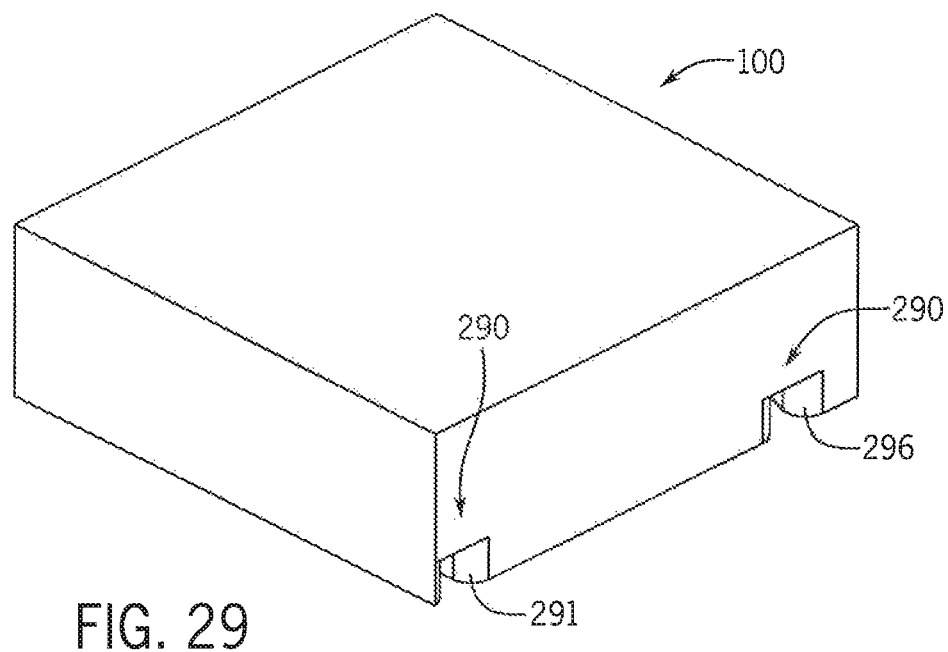
FIG. 29 is a perspective view of a mover taken from the front, top, and side for a switch track segment of the independent cart system of FIG. 24 with a two-way switch, including a right-hand path and a straight-path.
Figure 30:
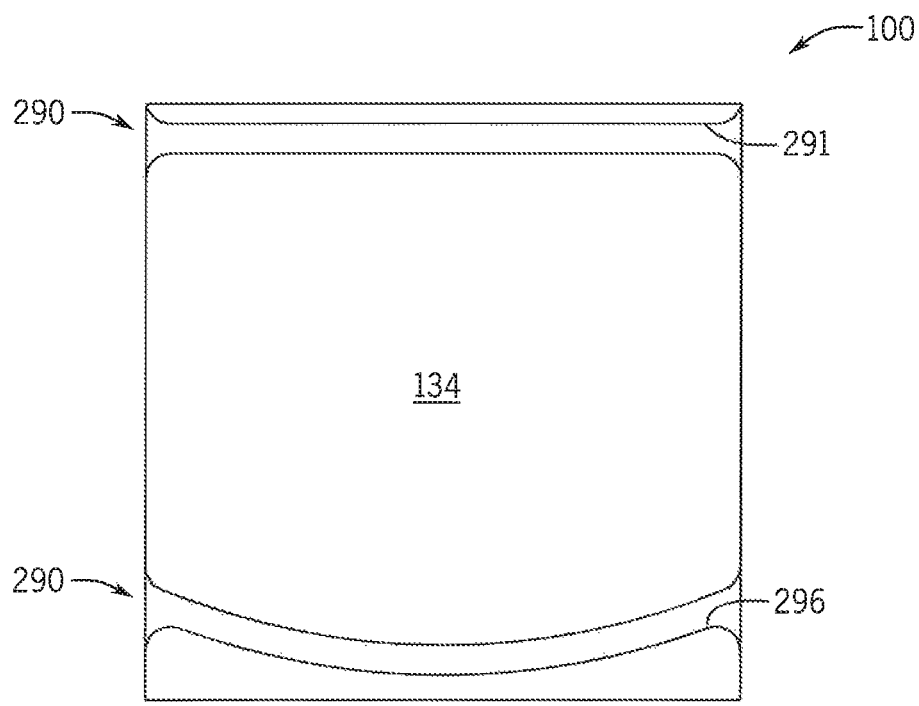
FIG. 30 is a bottom plan view of the mover of FIG. 29.

FIGS. 29 and 30 illustrate a mover 100 used with a switch track segment 200 having a straight path 204 and a right-hand path 206. The entrance to each channel 290 is curved or tapered to provide some tolerance for the channel 290 on the mover 100 engaging the pin 295 which is extended. As the mover 100 moves forward, the pin 295 fits within the channel 290 and causes the mover 100 to move according to the shape of the corresponding channel. As best seen in FIG. 30, the drive surface 134 of the mover 100 again includes two channels 290. A first channel 291 is provided to move along the straight path 204. The first channel 291 is linear and causes the mover 100 to continue traveling straight through the switch area. A second channel 296 is provided to move along the right-hand path 206. The second channel 296 is located along the outside edge of the drive surface 134 and is curved. As the second channel 296 engages the first pin 295 for the right-hand path 206, the mover 100 begins to curve towards the right-hand path. The mover 100 is then positioned such that the second channel 296 will similarly engage the second pin 295 for the right-hand path 206. The pair of pins 295 located within the second channel 296 will steer the mover 100 down the right-hand path. When the mover 100 has travelled a sufficient distance such that the second pin 295 exits the second channel 296, the mover 100 will be beyond the switch area and, at least in part, positioned over the control module 35 along the right-hand path 206, such that the control module 35 for the right-hand path 206 is able to continue driving the mover 100 along the right-hand path.

Figure 27:
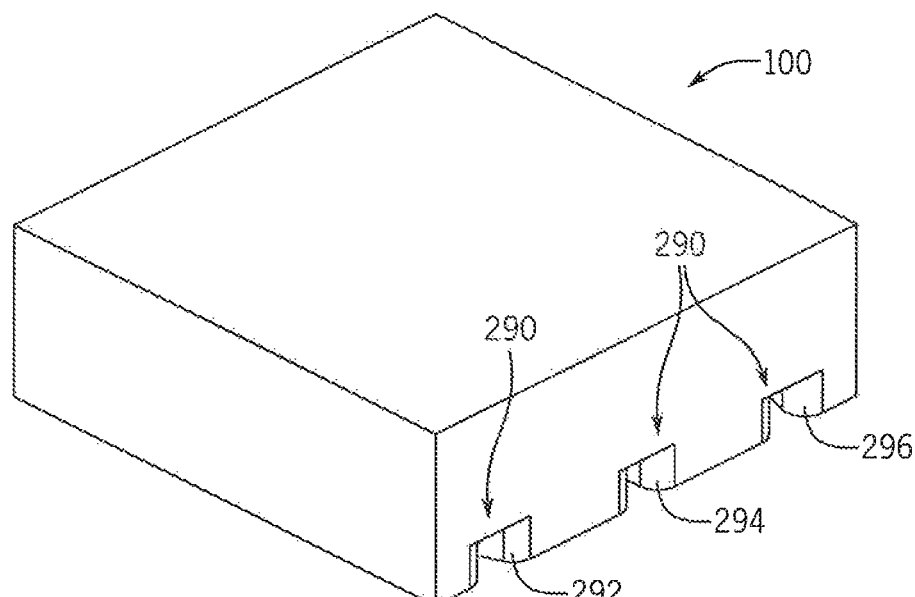
FIG. 27 is a perspective view of a mover taken from the front, top, and side for a switch track segment of the independent cart system of FIG. 24 with a three-way switch, including a right-hand path, a straight-path, and a left-hand path.
Figure 28:
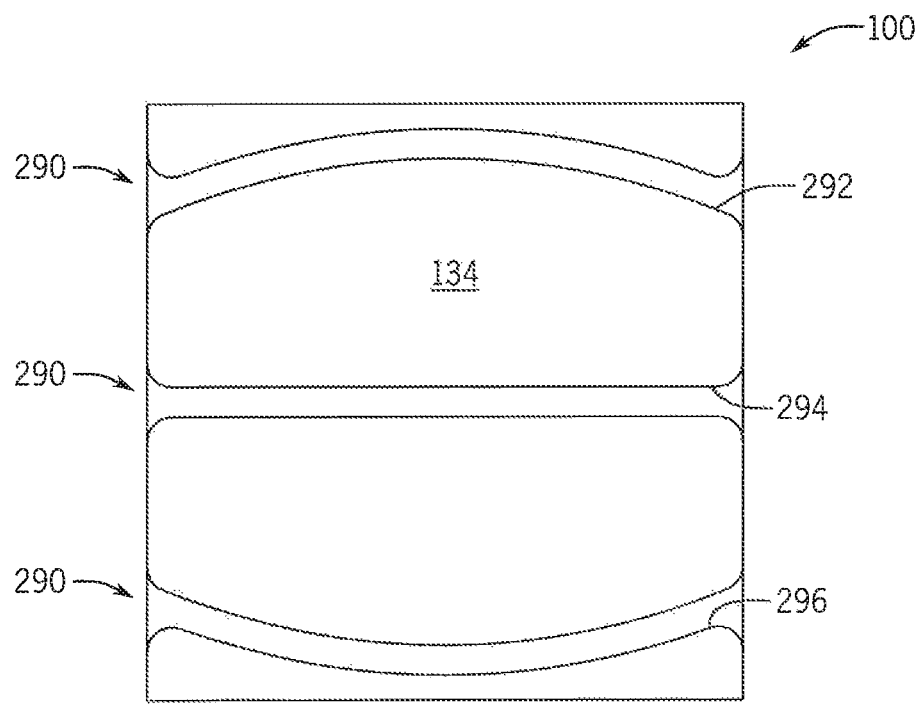
FIG. 28 is a bottom plan view of the mover of FIG. 27.

Each of the movers 100 illustrated in FIGS. 29-30 and FIGS. 31-32 are suited for track configurations having multiple paths that each return in the same orientation. For example, all of the switch track segments 200 have either left-hand or right-hand paths in combination with a straight path. More complex track configurations may include left-hand, right-hand, and straight path options. FIGS. 27-28 illustrate a mover 100 configured to move along any of the three different path options. The mover 100 includes three channels 290 located along the drive surface 134 of the mover 100.

The entrance to each channel 290 is curved or tapered to provide some tolerance for the channel 290 on the mover 100 engaging the pin 295 which is extended. As the mover 100 moves forward, the pin 295 fits within the channel 290 and causes the mover 100 to move according to the shape of the corresponding channel. As best seen in FIG. 28, the drive surface 134 of the mover 100 includes a first channel 292 to mover along a left-hand path, a second channel 294 to move along a straight path, and a third channel 296 to move along a right-hand path. The second channel 294 is linear and causes the mover 100 to continue traveling straight through the switch area, Each of the first and third channels 292, 296 are curved and configured to engage pins 295 to direct the mover 100 along the desired left or right-hand paths.

Sensors 210 are mounted along the straight path 204 and the left-hand path 202 to verify operation of the guide pins 295 and/or detect position of the mover 100 as it travels through the switch track segment 200. As shown in FIGS. 25 and 26, a sensor 210 may be mounted proximate each pin 295 to verify operation of the pin. The sensor 210 generates a feedback signal having a first value when the pin 295 is extended and a second value when the pin 295 is retracted. The controller may use this feedback signal to verify correct operation of each pin 295. As also discussed above, the sensor 210 may be configured to generate a signal as the mover 100 travels past the sensor. The feedback signal may vary as a function of the position of the mover 100 and the feedback signal from each sensor 210 may provide a redundant check on the position sensors 145 providing position information of each mover 100. Optionally, the feedback signal may simply be used to verify that the mover 100 has taken the desired path.

Turning next to FIGS. 33-37, a path selection device for another exemplary switch track segment 200 is illustrated. The embodiment shown in FIGS. 33-37 is a pin and channel configuration complementary to the embodiment discussed above with respect to FIGS. 24-32. The illustrated embodiment includes a pin 300 extending downward from a drive surface 134 of the mover 100. The pin 300 is configured to selectively engage one of multiple channels 302, 304 present on the switch track segment 200 in order to direct the mover 100 along a desired path.

According to the illustrated embodiment, the switch track segment 200 is a two-path switch with a straight path 204 and a right-hand path 206. A first channel 302 extends linearly from an adjoining track segment 12 along the straight path 204. A second channel 304 is arcuate and follows the bend of the right-hand path 206. In the illustrated embodiment, a diverter 308 is present on the track segment 12 positioned adjacent to the switch track segment 200. Optionally, the diverter 308 may be located on the switch track segment 200 and the adjacent track segment includes only a single channel 306 in which the pin 300 is configured to travel.

Figure 36:
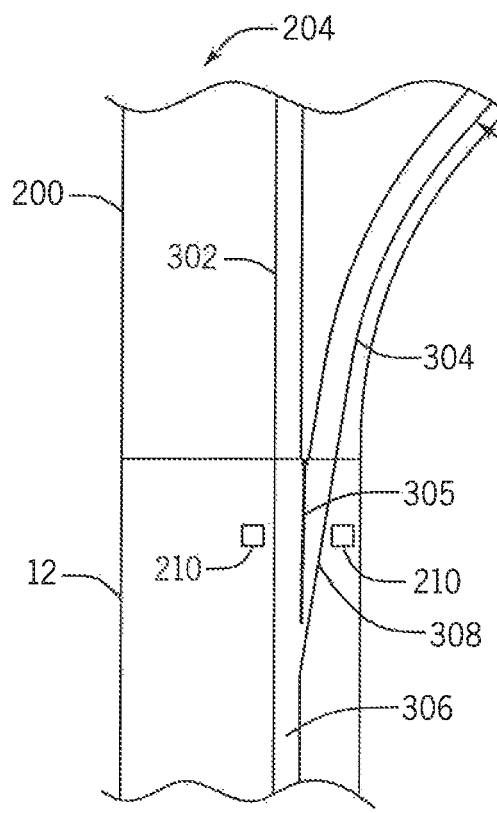
FIG. 36 is a top plan view of the switch track segment of FIG. 33 connected to a track segment with a diverter oriented in a first position.
Figure 37:
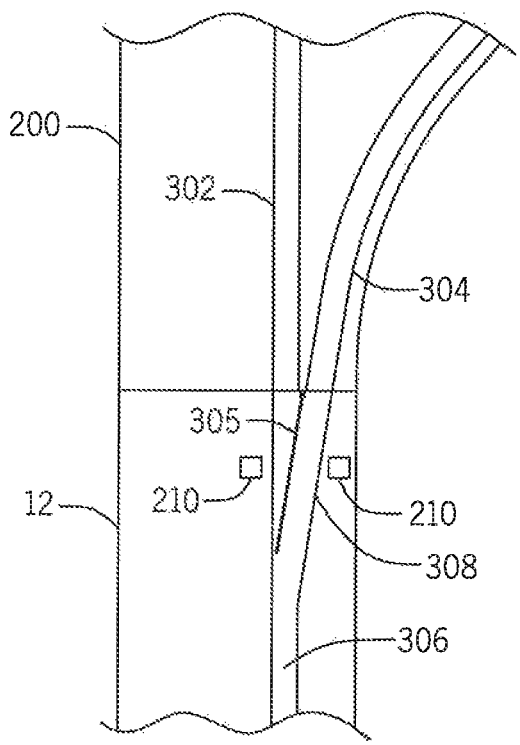
FIG. 37 is a top plan view of the switch track segment of FIG. 33 connected to a track segment with a diverter oriented in a second position.

As shown in FIGS. 36 and 37, the diverter 308 is configured to selectively direct a mover 100 along one of the two channels 302, 304 present on the switch track segment 200. In FIG. 36, the diverter 308 is oriented in a first position to guide the pin 300 from the channel 36 present on the adjacent track segment 12 into the first channel 302 on the switch track segment 200. In FIG. 37, the diverter 308 is oriented in a second position to guide the pin 300 from the channel 36 present on the adjacent track segment 12 into the second channel 304 on the switch track segment 200, Because the diverter needs to only cross a channel 302, 304 rather than an entire track, the length of the diverter is shorter than the diverter arm 250 discussed above. Further, the diverter 308 is located below the mover 100 and may transition from one position to another position as soon as the pin 300 passes the diverter 380. Thus, the diverter 380 may transition between states while a first mover 100 is still located above the diverter 380. The diverter 380 may then be in position for a second mover 100 following the first mover 100 prior to the first mover 100 travelling beyond the diverter 380. In this manner, movers 100 may follow at a minimum following distance based on the speed and acceleration/deceleration rates of the movers 100 rather than at a distance sufficient required for a path selection device to transition between states after a mover 100 has passed the path selection device.

With reference again to FIGS. 36 and 37, a transition region 305 is present on the track segment 12 adjacent to the switch track segment 200. Within this transition region 305 the channel 306 from the adjacent track segment 12 expands from a single channel into a delta configuration that aligns with the outside edges of both the first channel 302 and the second channel 304 present on the switch track segment. The diverter 380, located within this transition region, selectively aligns with the interior wall of either the first channel 302 or the second channel 304 to define the desired path along which the mover 100 is to travel. As previously indicated, the diverter 380 may be located on the switch track segment 200. It is contemplated that the entire transition region 305 may be positioned on the switch track segment 200. It is also contemplated that the adjacent track segment need not have any channel 306 present With reference again to FIGS. 8 and 9, the pin 300 may be located on the mover such that it is present between the upper surface 36 of the guiding segment 34 on one of the rails 30 and the control module 35. Alternately, the control module 35 may be configured such that the height of the control module 35 is recessed below the upper surface 36 of the guiding segment 34 a sufficient distance such that the pin 300 does not interfere with the control module 35 if the control module 35 is located below the pin 300. A natural void exists in the construction of the track segment 12' to accept the pin 300 travelling along the track segment without requiring a channel 306. The guide members 34 function in the manner described above to position the mover 100 on each track segment 12', and the pin 300 is only required to direct the mover 100 along a desired path of the switch track segment 200.

Sensors 210 are mounted along the straight path 204 and the right-hand path 206 to verify operation of the diverter 308 and/or detect position of the mover 100 as it travels through the switch track segment 200. As shown in FIGS. 36 and 37, a sensor 210 may be mounted on each side of the diverter 308 to verify operation of the diverter. Each sensor 210 generates a feedback signal having a first value when the diverter 308 is positioned adjacent to the sensor and a second value when the diverter 308 is positioned away from the sensor. The controller may use this feedback signal to verify correct operation of the diverter 380. Optionally, a single sensor 210 may be provided if the sensor is used solely to verify operation of the diverter 380. As also discussed above, the sensor 210 may be configured to generate a signal as the mover 100 travels past the sensor. The feedback signal may vary as a function of the position of the mover 100 and the feedback signal from each sensor 210 may provide a redundant check on the position sensors 145 providing position information of each mover 100. Optionally, the feedback signal may simply be used to verify that the mover 100 has taken the desired path.

Figure 38:
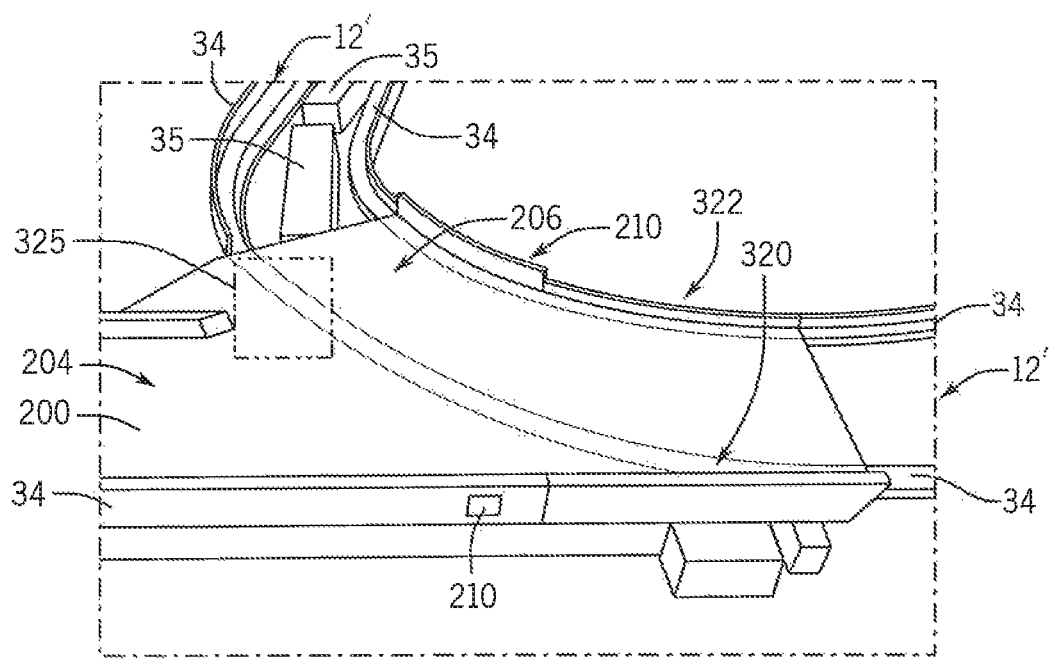
FIG. 38 is a view of another exemplary switch track segment from a top view and a side view.
Figure 39:
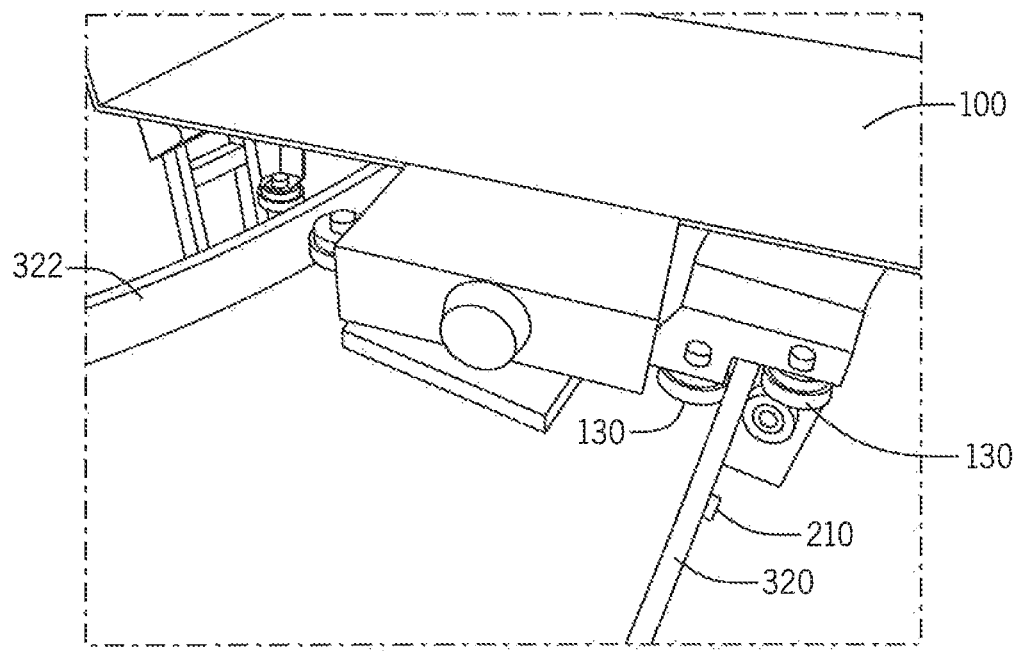
FIG. 39 is a perspective view of a mover configured to engage the switch track segment of FIG. 38.

Turning next to FIGS. 38 and 39, an additional path selection device according to yet another embodiment of the invention is illustrated. The illustrated mover 100 in FIGS. 38 and 39 has been modified to include guide wheels 130 oriented horizontally both on the inside and on the outside of the guiding segments 34 of the rails 30. Along tack segments 12 having a single path, the guide wheels 130 keep the mover 100 centrally positioned within the track and help drive the mover 100 along the rails 30. As a mover 100 approaches a switch track segment 200, the guide wheels 130 positioned on the outside of the guiding segments 34 selectively engage extendable guide segments 320, 322 to determine which path the mover 100 will follow.

According to the illustrated embodiment, the switch track segment 200 includes a straight path 204 and a right-hand path 206. A first extendable guide segment 320 is located along the straight path 204, and a second extendable guide segment 322 is located along the right-hand path 206. Each of the first and second extendable guide segments 320, 322 includes an actuator to selectively extend or retract the guide segment. When extended, the guide wheels 130 running along the inner and outer surface of the guide segment 320, 322 cause the mover 100 to follow along the extended guide segment. The first and second guide segments 320, 322 are selectively actuated such that only one or the other is extended at a time. When the first extendable guide segment 320 is extended, the mover 100 is directed along the straight path 204. By having the second extendable guide segment 322 retracted, the guide wheels 130 along the opposite rail of the track segment 12 leading into the switch track segment 200 may temporarily transition off of a guide segment 34. As the mover 100 travels through the switch region, an interior region 325 of the switch track segment 200 has no guide segments present. This interior region 325 includes the area of the switch track segment 200 where the straight path 204 and the right-hand path 206 diverge. A fixed guide segment 34 is present along the straight path 204 beyond the interior region 325 such that the guide wheels 130 which temporarily transitioned off the guide segment 34 when entering the switch track segment 200 may again engage the fixed guide segment 34 and resume operation with the opposing guide wheels to position the mover 100 within the track segment 12. Similarly, when the second extendable guide segment 322 is extended, the mover 100 is directed along the right-hand track segment 206. By having the first extendable guide segment 320 retracted, the guide wheels 130 along the opposite rail of the track segment 12 leading into the switch track segment 200 may temporarily transition off of a guide segment 34. As the mover 100 travels through the switch region, the interior region 325 of the switch track segment 200 has no guide segments present. A fixed guide segment 34 is present along the right-hand path 206 beyond the interior region 325 such that the guide wheels 130 which temporarily transitioned off the guide segment 34 when entering the switch track segment 200 may again engage the fixed guide segment 34 and resume operation with the opposing guide wheels to position the mover 100 within the track segment 12.

Although the illustrated embodiment shows a single extendable guide segment 320, 322 along each of the two paths, multiple extendable guide segments may be positioned along each path adjacent to each other. Each extendable guide segment may have a width less than a width required for the single extendable guide segment 320, 322 illustrated along each path. The extendable guide segments may be sequentially activated as a mover 100 travels along the switch track segment 200, The extendable guide segments 320, 322 may then remain extended, if a following mover 100 is to follow the same path, or be retracted as a mover 100 passes beyond each of the extendable guide segments, if a following mover is to follow the opposite path. Further, the guide wheels 130 are positioned toward the front of each mover 100. As the guide wheels 130 pass an extendable guide segment 320, 322 the extendable guide segment may be extended or retracted according to the desired direction of the next mover 100. Thus, the extendable guide segments 320, 322 may be ready to direct the next mover 100 along the desired path as the prior mover is completing its transit along its desired path.

Sensors 210 are mounted along the straight path 204 and the right-hand path 206 to verify operation of the extendable guide segments 320, 322 and/or detect position of the mover 100 as it travels through the switch track segment 200. As shown in FIGS. 38 and 39, a sensor 210 may be mounted proximate each of the extendable wide segments 320, 322. Each sensor 210 generates a feedback signal having a first value when the corresponding extendable guide segment 320 or 322 is raised and a second value when the corresponding extendable guide segment 320 or 322 is lowered. The controller may use this feedback signal to verify correct operation of the extendable guide segment 320, 322. As also discussed above, the sensor 210 may be configured to generate a signal as the mover 100 travels past the sensor. The feedback signal may vary as a function of the position of the mover 100 and the feedback signal from each sensor 210 may provide a redundant check on the position sensors 145 providing position information of each mover 100. Optionally, the feedback signal may simply be used to verify that the mover 100 has taken the desired path.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system for selecting one of multiple paths in a linear drive system, the system comprising:
   a plurality of track segments, wherein each track segment includes a first drive member for the linear drive system;
   at least one mover further comprising:
   a second drive member for the linear drive system, wherein the first and second drive members engage each other to drive the at least one mover along the plurality of track segments,
   a drive surface wherein the drive surface is oriented toward the plurality of track segments when the at least one mover is driven along the plurality of track segments,
   a first channel extending along the drive surface, and
   a second channel extending along the drive surface; and
   a switch track segment, wherein the switch track segment includes a first path and a second path along which the at least one mover may travel, the switch track segment further comprising:
   at least one first pin positioned along the first path, wherein the at least one first pin is extendable to engage the first channel of the at least one mover, and
   at least one second pin positioned along the second path, wherein the at least one second pin is extendable to engage the second channel of the at least one mover, wherein either the at least one first pin or the at least one second pin is extended to direct the at least one mover along either the first path or the second path, respectively.

2. The system of claim 1, wherein:
   the at least one first pin includes a plurality of first pins, and
   the at least one second pin includes a plurality of second pins.

3. The system of claim 2, wherein:
   the plurality of first pins are sequentially extended as the at least one mover approaches each of the plurality of first pins and sequentially retracted as the at least one mover leaves each of the plurality of first pins, and
   the plurality of second pins are sequentially extended as the at least one mover approaches each of the plurality of second pins and sequentially retracted as the at least one mover leaves each of the plurality of second pins.

4. The system of claim 1, wherein:
   the at least one mover further comprises a third channel extending along the drive surface, and
   the switch track segment further includes:
   a third path, and
   at least one third pin positioned along the third path, wherein the at least one third pin is extendable to engage the third channel of the at least one mover.

5. The system of claim 1, further comprising:
   at least one first sensor positioned along the first path to detect the at least one mover present on the first path; and
   at least one second sensor positioned along the second path to detect the at least one mover present on the second path.

6. The system of claim 5, wherein:
   the at least one first sensor is further configured to detect operation of the at least one first pin, and
   the at least one second sensor is further configured to detect operation of the at leas one second pin.

7. A system for selecting one of multiple paths in a linear drive system, the system comprising:
- a plurality of track segments, wherein each track segment further comprises:
  - a first drive member for the linear drive system, and
  - at least one guide rail extending along the track segment;
- at least one mover further comprising:
  - a second drive member for the linear drive system, wherein the first and second drive members engage each other to drive the at least one mover along the plurality of track segments, and
  - a plurality of guide wheels, wherein each guide wheel is configured to ride along the at least one guide rail for each track segment; and
- a switch track segment, wherein the switch track segment includes a first path and a second path along which the at least one mover may travel, the switch track segment further comprising:
  - at least one first extendable guide rail positioned along the first path, and
  - at least one second extendable guide rail positioned along the second path, wherein either the at least one first extendable guide rail or the at least one second extendable guide rail is extended to direct the at least one mover along either the first path or the second path, respectively.

8. The system of claim 7, wherein:
the at least one first extendable guide rail includes a plurality of first guide rail segments, and
the at least one second extendable guide rail includes a plurality of second guide rail segments.

9. The system of claim 8, wherein:
the plurality of first guide rail segments are sequentially extended as the at least one mover approaches each of the plurality of first guide rail segments and sequentially retracted as the at least one mover leaves each of the plurality of first guide rail segments, and
the plurality of second guide rail segments are sequentially extended as the at least one mover approaches each of the plurality of second guide rail segments and sequentially retracted as the at least one mover leaves each of the plurality of second guide rail segments.

10. The system of claim 7, wherein:
the switch track segment further includes:
- a third path, and
- at least one third extendable guide rail positioned along the third path, wherein the at least one third extendable guide rail is extendable to direct the at least one mover along the third path.

11. The system of claim 7, further comprising:
at least one first sensor positioned along the first path to detect the at least one mover present on the first path; and
at least one second sensor positioned along the second path to detect the at least one mover present on the second path.

12. The system of claim 11, wherein:
the at least one first sensor is further configured to detect when the at least one first extendable guide rail is extended, and
the at least one second sensor is further configured to detect when the at least one second extendable guide rail is extended.

13. A system for selecting one of multiple paths in a linear drive system, the system comprising:
- a plurality of track segments, wherein each track segment further comprises a first drive member for the linear drive system;
- at least one mover further comprising a second drive member for the linear drive system, wherein the first and second drive members engage each other to drive the at least one mover along the plurality of track segments;
- a switch track segment, wherein the switch track segment includes a first path and a second path along which the at least one mover may travel;
- at least one electromagnet positioned on either the first path, the second path, or the at least one mover; and
- at least one magnetically receptive device positioned on either the first path, the second path, or the at least one mover, wherein:
the at least one electromagnet and the at least one magnetically receptive device are configured to selectively direct the at least one mover along either the first path or the second path.

14. The system of claim 13, wherein:
the at least one electromagnet includes a plurality of electromagnets;
a first portion of the plurality of electromagnets are located along the first path; and
a second portion of the plurality of electromagnets are located along the second path.

15. The system of claim 14, wherein:
the first portion of the plurality of electromagnets are sequentially activated as the at least one mover travels along the switch track segment to direct the at least one mover along the first path; and
the second portion of the plurality of electromagnets are sequentially activated as the at least one mover travels along the switch track segment to direct the at least one mover along the second path.

16. The system of claim 14, wherein the at least one magnetically receptive device includes a first steel side wall mounted on a first side of the at least one mover and a second steel side wall mounted on a second side of the at least one mover.

17. The system of claim 14, wherein the at least one magnetically receptive device includes a first permanent magnet mounted on a first side of the at least one mover and a second permanent magnet mounted on a second side of the at least one mover.

18. The system of claim 17, wherein:
the first portion of the plurality of electromagnets are located along the first path proximate an input portion of the switch track segment, and
the second portion of the plurality of electromagnets are located along the second path proximate the input portion of the switch track segment, the system further comprising:
- a first set of steel plates extending along the first path beyond the first portion of the plurality of electromagnets; and
- a second set of steel plates extending along the second path beyond the second portion of the plurality of electromagnets.

19. The system of claim 13, wherein:
the at least one electromagnet includes a first electromagnet mounted on a first side of the at least one mover and a second electromagnet mounted on a second side of the at least one mover; and
the at least one magnetically receptive device includes a first set of magnetically receptive devices mounted along the first path and a second set of magnetically receptive devices mounted along the second path.

20. The system of claim 13, further comprising:

at least one first sensor positioned along the first path to detect the at least one mover present on the first path; and at least one second sensor positioned along the second path to detect the at least one mover present on the second path.

* * * * *